United States Patent
Banerjee et al.

(10) Patent No.: US 12,496,728 B2
(45) Date of Patent: Dec. 16, 2025

(54) SURGICAL ROBOTIC SYSTEM AND METHOD FOR RESTORING OPERATIONAL STATE

(71) Applicant: Covidien LP, Mansfield, MA (US)

(72) Inventors: Saumya Banerjee, Southington, CT (US); Paul M. Loschak, Somerville, MA (US)

(73) Assignee: Covidien LP, Mansfield, MA (US)

( * ) Notice: Subject to any disclaimer, the term of this patent is extended or adjusted under 35 U.S.C. 154(b) by 50 days.

(21) Appl. No.: 18/382,019

(22) Filed: Oct. 19, 2023

(65) Prior Publication Data

US 2024/0131723 A1 Apr. 25, 2024
US 2024/0227200 A9 Jul. 11, 2024

Related U.S. Application Data

(60) Provisional application No. 63/419,047, filed on Oct. 25, 2022.

(51) Int. Cl.
*B25J 13/06* (2006.01)
*A61B 34/00* (2016.01)
*A61B 34/30* (2016.01)
*A61B 34/37* (2016.01)

(52) U.S. Cl.
CPC .............. *B25J 13/06* (2013.01); *A61B 34/25* (2016.02); *A61B 34/37* (2016.02); *A61B 2034/254* (2016.02); *A61B 2034/301* (2016.02)

(58) Field of Classification Search
CPC ......... B25J 13/06; B25J 9/1689; A61B 34/25; A61B 34/37; A61B 2034/254; A61B 2034/301; A61B 2034/2059; A61B 34/30; A61B 34/74; G05B 2219/50102
See application file for complete search history.

(56) References Cited

U.S. PATENT DOCUMENTS

| | | | |
|---|---|---|---|
| 6,132,368 | A | 10/2000 | Cooper |
| 6,206,903 | B1 | 3/2001 | Ramans |
| 6,246,200 | B1 | 6/2001 | Blumenkranz et al. |
| 6,312,435 | B1 | 11/2001 | Wallace et al. |
| 6,331,181 | B1 | 12/2001 | Tierney et al. |
| 6,394,998 | B1 | 5/2002 | Wallace et al. |

(Continued)

*Primary Examiner* — Harry Y Oh
(74) *Attorney, Agent, or Firm* — Carter, DeLuca & Farrell LLP

(57) ABSTRACT

A surgical robotic system includes a surgical robotic arm having an instrument and an instrument drive unit configured to actuate the instrument. The system also includes a storage device and a controller configured to store a save point on the storage device, the save point including configuration data pertaining to at least one of the surgical robotic arm, the instrument drive unit, or the instrument. The controller is further configured to detect an error resulting in a reboot of at least one of the surgical robotic arm, the instrument drive unit, or the instrument. The controller is additionally configured to access the configuration data of the save point after the reboot of at least one of the surgical robotic arm, the instrument drive unit, or the instrument. The controller is also configured to output a graphical user interface including instructions for restoring at least one of the surgical robotic arm, the instrument drive unit, or the instrument based on the configuration data.

20 Claims, 10 Drawing Sheets

(56) References Cited

U.S. PATENT DOCUMENTS

| | | |
|---|---|---|
| 6,424,885 B1 | 7/2002 | Niemeyer et al. |
| 6,441,577 B2 | 8/2002 | Blumenkranz et al. |
| 6,459,926 B1 | 10/2002 | Nowlin et al. |
| 6,491,691 B1 | 12/2002 | Morley et al. |
| 6,491,701 B2 | 12/2002 | Tierney et al. |
| 6,493,608 B1 | 12/2002 | Niemeyer |
| 6,565,554 B1 | 5/2003 | Niemeyer |
| 6,645,196 B1 | 11/2003 | Nixon et al. |
| 6,659,939 B2 | 12/2003 | Moll |
| 6,671,581 B2 | 12/2003 | Niemeyer et al. |
| 6,676,684 B1 | 1/2004 | Morley et al. |
| 6,685,698 B2 | 2/2004 | Morley et al. |
| 6,699,235 B2 | 3/2004 | Wallace et al. |
| 6,714,839 B2 | 3/2004 | Salisbury, Jr. et al. |
| 6,716,233 B1 | 4/2004 | Whitman |
| 6,728,599 B2 | 4/2004 | Wang et al. |
| 6,746,443 B1 | 6/2004 | Morley et al. |
| 6,766,204 B2 | 7/2004 | Niemeyer et al. |
| 6,770,081 B1 | 8/2004 | Cooper et al. |
| 6,772,053 B2 | 8/2004 | Niemeyer |
| 6,783,524 B2 | 8/2004 | Anderson et al. |
| 6,793,652 B1 | 9/2004 | Whitman et al. |
| 6,793,653 B2 | 9/2004 | Sanchez et al. |
| 6,799,065 B1 | 9/2004 | Niemeyer |
| 6,837,883 B2 | 1/2005 | Moll et al. |
| 6,839,612 B2 | 1/2005 | Sanchez et al. |
| 6,840,938 B1 | 1/2005 | Morley et al. |
| 6,843,403 B2 | 1/2005 | Whitman |
| 6,846,309 B2 | 1/2005 | Whitman et al. |
| 6,866,671 B2 | 3/2005 | Tierney et al. |
| 6,871,117 B2 | 3/2005 | Wang et al. |
| 6,879,880 B2 | 4/2005 | Nowlin et al. |
| 6,899,705 B2 | 5/2005 | Niemeyer |
| 6,902,560 B1 | 6/2005 | Morley et al. |
| 6,936,042 B2 | 8/2005 | Wallace et al. |
| 6,951,535 B2 | 10/2005 | Ghodoussi et al. |
| 6,974,449 B2 | 12/2005 | Niemeyer |
| 6,991,627 B2 | 1/2006 | Madhani et al. |
| 6,994,708 B2 | 2/2006 | Manzo |
| 7,048,745 B2 | 5/2006 | Tierney et al. |
| 7,066,926 B2 | 6/2006 | Wallace et al. |
| 7,118,582 B1 | 10/2006 | Wang et al. |
| 7,125,403 B2 | 10/2006 | Julian et al. |
| 7,155,315 B2 | 12/2006 | Niemeyer et al. |
| 7,239,940 B2 | 7/2007 | Wang et al. |
| 7,306,597 B2 | 12/2007 | Manzo |
| 7,357,774 B2 | 4/2008 | Cooper |
| 7,373,219 B2 | 5/2008 | Nowlin et al. |
| 7,379,790 B2 | 5/2008 | Toth et al. |
| 7,386,365 B2 | 6/2008 | Nixon |
| 7,391,173 B2 | 6/2008 | Schena |
| 7,398,707 B2 | 7/2008 | Morley et al. |
| 7,413,565 B2 | 8/2008 | Wang et al. |
| 7,453,227 B2 | 11/2008 | Prisco et al. |
| 7,524,320 B2 | 4/2009 | Tierney et al. |
| 7,574,250 B2 | 8/2009 | Niemeyer |
| 7,594,912 B2 | 9/2009 | Cooper et al. |
| 7,607,440 B2 | 10/2009 | Coste-Maniere et al. |
| 7,666,191 B2 | 2/2010 | Orban, III et al. |
| 7,682,357 B2 | 3/2010 | Ghodoussi et al. |
| 7,689,320 B2 | 3/2010 | Prisco et al. |
| 7,695,481 B2 | 4/2010 | Wang et al. |
| 7,695,485 B2 | 4/2010 | Whitman et al. |
| 7,699,855 B2 | 4/2010 | Anderson et al. |
| 7,713,263 B2 | 5/2010 | Niemeyer |
| 7,725,214 B2 | 5/2010 | Diolaiti |
| 7,727,244 B2 | 6/2010 | Orban, III et al. |
| 7,741,802 B2 | 6/2010 | Prisco |
| 7,756,036 B2 | 7/2010 | Druke et al. |
| 7,757,028 B2 | 7/2010 | Druke et al. |
| 7,762,825 B2 | 7/2010 | Burbank et al. |
| 7,778,733 B2 | 8/2010 | Nowlin et al. |
| 7,803,151 B2 | 9/2010 | Whitman |
| 7,806,891 B2 | 10/2010 | Nowlin et al. |
| 7,819,859 B2 | 10/2010 | Prisco et al. |
| 7,819,885 B2 | 10/2010 | Cooper |
| 7,824,401 B2 | 11/2010 | Manzo et al. |
| 7,835,823 B2 | 11/2010 | Sillman et al. |
| 7,843,158 B2 | 11/2010 | Prisco |
| 7,865,266 B2 | 1/2011 | Moll et al. |
| 7,865,269 B2 | 1/2011 | Prisco et al. |
| 7,886,743 B2 | 2/2011 | Cooper et al. |
| 7,899,578 B2 | 3/2011 | Prisco et al. |
| 7,907,166 B2 | 3/2011 | Lamprecht et al. |
| 7,935,130 B2 | 5/2011 | Williams |
| 7,963,913 B2 | 6/2011 | Devengenzo et al. |
| 7,983,793 B2 | 7/2011 | Toth et al. |
| 8,002,767 B2 | 8/2011 | Sanchez |
| 8,004,229 B2 | 8/2011 | Nowlin et al. |
| 8,012,170 B2 | 9/2011 | Whitman et al. |
| 8,054,752 B2 | 11/2011 | Druke et al. |
| 8,062,288 B2 | 11/2011 | Cooper et al. |
| 8,079,950 B2 | 12/2011 | Stern et al. |
| 8,100,133 B2 | 1/2012 | Mintz et al. |
| 8,108,072 B2 | 1/2012 | Zhao et al. |
| 8,120,301 B2 | 2/2012 | Goldberg et al. |
| 8,142,447 B2 | 3/2012 | Cooper et al. |
| 8,147,503 B2 | 4/2012 | Zhao et al. |
| 8,151,661 B2 | 4/2012 | Schena et al. |
| 8,155,479 B2 | 4/2012 | Hoffman et al. |
| 8,182,469 B2 | 5/2012 | Anderson et al. |
| 8,202,278 B2 | 6/2012 | Orban, III et al. |
| 8,206,406 B2 | 6/2012 | Orban, III |
| 8,210,413 B2 | 7/2012 | Whitman et al. |
| 8,216,250 B2 | 7/2012 | Orban, III et al. |
| 8,220,468 B2 | 7/2012 | Cooper et al. |
| 8,256,319 B2 | 9/2012 | Cooper et al. |
| 8,285,517 B2 | 10/2012 | Sillman et al. |
| 8,315,720 B2 | 11/2012 | Mohr et al. |
| 8,335,590 B2 | 12/2012 | Costa et al. |
| 8,345,678 B2 * | 1/2013 | Cheng .................. H04L 45/302 370/235 |
| 8,347,757 B2 | 1/2013 | Duval |
| 8,374,723 B2 | 2/2013 | Zhao et al. |
| 8,418,073 B2 | 4/2013 | Mohr et al. |
| 8,419,717 B2 | 4/2013 | Diolaiti et al. |
| 8,423,182 B2 | 4/2013 | Robinson et al. |
| 8,452,447 B2 | 5/2013 | Nixon |
| 8,454,585 B2 | 6/2013 | Whitman |
| 8,499,992 B2 | 8/2013 | Whitman et al. |
| 8,508,173 B2 | 8/2013 | Goldberg et al. |
| 8,528,440 B2 | 9/2013 | Morley et al. |
| 8,529,582 B2 | 9/2013 | Devengenzo et al. |
| 8,540,748 B2 | 9/2013 | Murphy et al. |
| 8,551,116 B2 | 10/2013 | Julian et al. |
| 8,562,594 B2 | 10/2013 | Cooper et al. |
| 8,594,841 B2 | 11/2013 | Zhao et al. |
| 8,597,182 B2 | 12/2013 | Stein et al. |
| 8,597,280 B2 | 12/2013 | Cooper et al. |
| 8,600,551 B2 | 12/2013 | Itkowitz et al. |
| 8,608,773 B2 | 12/2013 | Tierney et al. |
| 8,620,473 B2 | 12/2013 | Diolaiti et al. |
| 8,624,537 B2 | 1/2014 | Nowlin et al. |
| 8,634,957 B2 | 1/2014 | Toth et al. |
| 8,638,056 B2 | 1/2014 | Goldberg et al. |
| 8,638,057 B2 | 1/2014 | Goldberg et al. |
| 8,644,988 B2 | 2/2014 | Prisco et al. |
| 8,666,544 B2 | 3/2014 | Moll et al. |
| 8,668,638 B2 | 3/2014 | Donhowe et al. |
| 8,746,252 B2 | 6/2014 | McGrogan et al. |
| 8,749,189 B2 | 6/2014 | Nowlin et al. |
| 8,749,190 B2 | 6/2014 | Nowlin et al. |
| 8,758,352 B2 | 6/2014 | Cooper et al. |
| 8,761,930 B2 | 6/2014 | Nixon |
| 8,768,516 B2 | 7/2014 | Diolaiti et al. |
| 8,786,241 B2 | 7/2014 | Nowlin et al. |
| 8,790,243 B2 | 7/2014 | Cooper et al. |
| 8,808,164 B2 | 8/2014 | Hoffman et al. |
| 8,816,628 B2 | 8/2014 | Nowlin et al. |
| 8,821,480 B2 | 9/2014 | Burbank |
| 8,823,308 B2 | 9/2014 | Nowlin et al. |
| 8,827,989 B2 | 9/2014 | Niemeyer |
| 8,838,270 B2 | 9/2014 | Druke et al. |
| 8,852,174 B2 | 10/2014 | Burbank |

(56) References Cited

U.S. PATENT DOCUMENTS

| | | |
|---|---|---|
| 8,858,547 B2 | 10/2014 | Brogna |
| 8,862,268 B2 | 10/2014 | Robinson et al. |
| 8,864,751 B2 | 10/2014 | Prisco et al. |
| 8,864,752 B2 | 10/2014 | Diolaiti et al. |
| 8,903,546 B2 | 12/2014 | Diolaiti et al. |
| 8,903,549 B2 | 12/2014 | Itkowitz et al. |
| 8,911,428 B2 | 12/2014 | Cooper et al. |
| 8,912,746 B2 | 12/2014 | Reid et al. |
| 8,944,070 B2 | 2/2015 | Guthart |
| 8,989,903 B2 | 3/2015 | Weir et al. |
| 9,002,518 B2 | 4/2015 | Manzo |
| 9,014,856 B2 | 4/2015 | Manzo et al. |
| 9,016,540 B2 | 4/2015 | Whitman et al. |
| 9,019,345 B2 | 4/2015 | O'Grady et al. |
| 9,043,027 B2 | 5/2015 | Durant et al. |
| 9,050,120 B2 | 6/2015 | Swarup et al. |
| 9,055,961 B2 | 6/2015 | Manzo et al. |
| 9,068,628 B2 | 6/2015 | Solomon et al. |
| 9,078,684 B2 | 7/2015 | Williams |
| 9,084,623 B2 | 7/2015 | Gomez et al. |
| 9,095,362 B2 | 8/2015 | Dachs, II et al. |
| 9,096,033 B2 | 8/2015 | Holop et al. |
| 9,101,381 B2 | 8/2015 | Burbank et al. |
| 9,113,877 B1 | 8/2015 | Whitman et al. |
| 9,138,284 B2 | 9/2015 | Krom et al. |
| 9,144,456 B2 | 9/2015 | Rosa et al. |
| 9,198,730 B2 | 12/2015 | Prisco et al. |
| 9,204,923 B2 | 12/2015 | Manzo et al. |
| 9,226,648 B2 | 1/2016 | Saadat et al. |
| 9,226,750 B2 | 1/2016 | Weir et al. |
| 9,226,761 B2 | 1/2016 | Burbank |
| 9,232,984 B2 | 1/2016 | Guthart et al. |
| 9,241,766 B2 | 1/2016 | Duque et al. |
| 9,241,767 B2 | 1/2016 | Prisco et al. |
| 9,241,769 B2 | 1/2016 | Larkin et al. |
| 9,259,275 B2 | 2/2016 | Burbank |
| 9,259,277 B2 | 2/2016 | Rogers et al. |
| 9,259,281 B2 | 2/2016 | Griffiths et al. |
| 9,259,282 B2 | 2/2016 | Azizian et al. |
| 9,261,172 B2 | 2/2016 | Solomon et al. |
| 9,265,567 B2 | 2/2016 | Orban, III et al. |
| 9,265,584 B2 | 2/2016 | Itkowitz et al. |
| 9,283,049 B2 | 3/2016 | Diolaiti et al. |
| 9,286,351 B2 * | 3/2016 | Lundberg ............... G06F 40/237 |
| 9,301,811 B2 | 4/2016 | Goldberg et al. |
| 9,314,307 B2 | 4/2016 | Richmond et al. |
| 9,317,651 B2 | 4/2016 | Nixon |
| 9,345,546 B2 | 5/2016 | Toth et al. |
| 9,393,017 B2 | 7/2016 | Flanagan et al. |
| 9,402,689 B2 | 8/2016 | Prisco et al. |
| 9,417,621 B2 | 8/2016 | Diolaiti |
| 9,424,303 B2 | 8/2016 | Hoffman et al. |
| 9,433,418 B2 | 9/2016 | Whitman et al. |
| 9,446,517 B2 * | 9/2016 | Burns ................... A61B 34/37 |
| 9,452,020 B2 | 9/2016 | Griffiths et al. |
| 9,474,569 B2 | 10/2016 | Manzo et al. |
| 9,480,533 B2 | 11/2016 | Devengenzo et al. |
| 9,503,713 B2 | 11/2016 | Zhao et al. |
| 9,550,300 B2 | 1/2017 | Danitz et al. |
| 9,554,859 B2 | 1/2017 | Nowlin et al. |
| 9,566,124 B2 | 2/2017 | Prisco et al. |
| 9,579,164 B2 | 2/2017 | Itkowitz et al. |
| 9,585,641 B2 | 3/2017 | Cooper et al. |
| 9,615,883 B2 | 4/2017 | Schena et al. |
| 9,623,563 B2 | 4/2017 | Nixon |
| 9,623,902 B2 | 4/2017 | Griffiths et al. |
| 9,629,520 B2 | 4/2017 | Diolaiti |
| 9,662,177 B2 | 5/2017 | Weir et al. |
| 9,664,262 B2 | 5/2017 | Donlon et al. |
| 9,675,354 B2 | 6/2017 | Weir et al. |
| 9,687,312 B2 | 6/2017 | Dachs, II et al. |
| 9,700,334 B2 | 7/2017 | Hinman et al. |
| 9,718,190 B2 | 8/2017 | Larkin et al. |
| 9,730,719 B2 | 8/2017 | Brisson et al. |
| 9,737,199 B2 | 8/2017 | Pistor et al. |
| 9,795,446 B2 | 10/2017 | DiMaio et al. |
| 9,797,484 B2 | 10/2017 | Solomon et al. |
| 9,801,690 B2 | 10/2017 | Larkin et al. |
| 9,814,530 B2 | 11/2017 | Weir et al. |
| 9,814,536 B2 | 11/2017 | Goldberg et al. |
| 9,814,537 B2 | 11/2017 | Itkowitz et al. |
| 9,820,823 B2 | 11/2017 | Richmond et al. |
| 9,827,059 B2 | 11/2017 | Robinson et al. |
| 9,830,371 B2 | 11/2017 | Hoffman et al. |
| 9,839,481 B2 | 12/2017 | Blumenkranz et al. |
| 9,839,487 B2 | 12/2017 | Dachs, II |
| 9,850,994 B2 | 12/2017 | Schena |
| 9,855,102 B2 | 1/2018 | Blumenkranz |
| 9,855,107 B2 | 1/2018 | Labonville et al. |
| 9,872,737 B2 | 1/2018 | Nixon |
| 9,877,718 B2 | 1/2018 | Weir et al. |
| 9,883,920 B2 | 2/2018 | Blumenkranz |
| 9,888,974 B2 | 2/2018 | Niemeyer |
| 9,895,813 B2 | 2/2018 | Blumenkranz et al. |
| 9,901,408 B2 | 2/2018 | Larkin |
| 9,918,800 B2 | 3/2018 | Itkowitz et al. |
| 9,943,375 B2 | 4/2018 | Blumenkranz et al. |
| 9,948,852 B2 | 4/2018 | Lilagan et al. |
| 9,949,798 B2 | 4/2018 | Weir |
| 9,949,802 B2 | 4/2018 | Cooper |
| 9,952,107 B2 | 4/2018 | Blumenkranz et al. |
| 9,956,044 B2 | 5/2018 | Gomez et al. |
| 9,980,778 B2 | 5/2018 | Ohline et al. |
| 10,008,017 B2 | 6/2018 | Itkowitz et al. |
| 10,028,793 B2 | 7/2018 | Griffiths et al. |
| 10,033,308 B2 | 7/2018 | Chaghajerdi et al. |
| 10,034,719 B2 | 7/2018 | Richmond et al. |
| 10,052,167 B2 | 8/2018 | Au et al. |
| 10,085,811 B2 | 10/2018 | Weir et al. |
| 10,092,165 B2 | 10/2018 | Power |
| 10,092,344 B2 | 10/2018 | Mohr et al. |
| 10,123,844 B2 | 11/2018 | Nowlin |
| 10,188,471 B2 | 1/2019 | Brisson |
| 10,201,390 B2 | 2/2019 | Swarup et al. |
| 10,213,202 B2 | 2/2019 | Flanagan et al. |
| 10,258,416 B2 | 4/2019 | Mintz et al. |
| 10,278,782 B2 | 5/2019 | Jarc et al. |
| 10,278,783 B2 | 5/2019 | Itkowitz et al. |
| 10,282,881 B2 | 5/2019 | Itkowitz et al. |
| 10,335,242 B2 | 7/2019 | Devengenzo et al. |
| 10,405,934 B2 | 9/2019 | Prisco et al. |
| 10,433,922 B2 | 10/2019 | Itkowitz et al. |
| 10,464,219 B2 | 11/2019 | Robinson et al. |
| 10,485,621 B2 | 11/2019 | Morrissette et al. |
| 10,500,004 B2 | 12/2019 | Hanuschik et al. |
| 10,500,005 B2 | 12/2019 | Weir et al. |
| 10,500,007 B2 | 12/2019 | Richmond et al. |
| 10,507,066 B2 | 12/2019 | DiMaio et al. |
| 10,510,267 B2 | 12/2019 | Jarc et al. |
| 10,524,871 B2 | 1/2020 | Liao |
| 10,548,459 B2 | 2/2020 | Itkowitz et al. |
| 10,575,909 B2 | 3/2020 | Robinson et al. |
| 10,592,529 B2 | 3/2020 | Hoffman et al. |
| 10,595,946 B2 | 3/2020 | Nixon |
| 10,881,469 B2 | 1/2021 | Robinson |
| 10,881,473 B2 | 1/2021 | Itkowitz et al. |
| 10,898,188 B2 | 1/2021 | Burbank |
| 10,898,189 B2 | 1/2021 | McDonald, II |
| 10,905,506 B2 | 2/2021 | Itkowitz et al. |
| 10,912,544 B2 | 2/2021 | Brisson et al. |
| 10,912,619 B2 | 2/2021 | Jarc et al. |
| 10,918,387 B2 | 2/2021 | Duque et al. |
| 10,918,449 B2 | 2/2021 | Solomon et al. |
| 10,932,873 B2 | 3/2021 | Griffiths et al. |
| 10,932,877 B2 | 3/2021 | Devengenzo et al. |
| 10,939,969 B2 | 3/2021 | Swarup et al. |
| 10,939,973 B2 | 3/2021 | DiMaio et al. |
| 10,952,801 B2 | 3/2021 | Miller et al. |
| 10,965,933 B2 | 3/2021 | Jarc |
| 10,966,742 B2 | 4/2021 | Rosa et al. |
| 10,973,517 B2 | 4/2021 | Wixey |
| 10,973,519 B2 | 4/2021 | Weir et al. |
| 10,984,567 B2 | 4/2021 | Itkowitz et al. |
| 10,993,773 B2 | 5/2021 | Cooper et al. |

(56) References Cited

U.S. PATENT DOCUMENTS

| | | | |
|---|---|---|---|
| 10,993,775 B2 | 5/2021 | Cooper et al. |
| 11,000,331 B2 | 5/2021 | Krom et al. |
| 11,013,567 B2 | 5/2021 | Wu et al. |
| 11,020,138 B2 | 6/2021 | Ragosta |
| 11,020,191 B2 | 6/2021 | Diolaiti et al. |
| 11,020,193 B2 | 6/2021 | Wixey et al. |
| 11,026,755 B2 | 6/2021 | Weir et al. |
| 11,026,759 B2 | 6/2021 | Donlon et al. |
| 11,040,189 B2 | 6/2021 | Vaders et al. |
| 11,045,077 B2 | 6/2021 | Stern et al. |
| 11,045,274 B2 | 6/2021 | Dachs, II et al. |
| 11,058,501 B2 | 7/2021 | Tokarchuk et al. |
| 11,076,925 B2 | 8/2021 | DiMaio et al. |
| 11,090,119 B2 | 8/2021 | Burbank |
| 11,096,687 B2 | 8/2021 | Flanagan et al. |
| 11,098,803 B2 | 8/2021 | Duque et al. |
| 11,109,925 B2 | 9/2021 | Cooper et al. |
| 11,116,578 B2 | 9/2021 | Hoffman et al. |
| 11,129,683 B2 | 9/2021 | Steger et al. |
| 11,135,029 B2 | 10/2021 | Suresh et al. |
| 11,147,552 B2 | 10/2021 | Burbank et al. |
| 11,147,640 B2 | 10/2021 | Jarc et al. |
| 11,154,373 B2 | 10/2021 | Abbott et al. |
| 11,154,374 B2 | 10/2021 | Hanuschik et al. |
| 11,160,622 B2 | 11/2021 | Goldberg et al. |
| 11,160,625 B2 | 11/2021 | Wixey et al. |
| 11,161,243 B2 | 11/2021 | Rabindran et al. |
| 11,166,758 B2 | 11/2021 | Mohr et al. |
| 11,166,770 B2 | 11/2021 | DiMaio et al. |
| 11,166,773 B2 | 11/2021 | Ragosta et al. |
| 11,173,597 B2 | 11/2021 | Rabindran et al. |
| 11,185,378 B2 | 11/2021 | Weir et al. |
| 11,191,596 B2 | 12/2021 | Thompson et al. |
| 11,197,729 B2 | 12/2021 | Thompson et al. |
| 11,213,360 B2 | 1/2022 | Hourtash et al. |
| 11,221,863 B2 | 1/2022 | Azizian et al. |
| 11,234,700 B2 | 2/2022 | Ragosta et al. |
| 11,241,274 B2 | 2/2022 | Vaders et al. |
| 11,241,290 B2 | 2/2022 | Waterbury et al. |
| 11,259,870 B2 | 3/2022 | DiMaio et al. |
| 11,259,884 B2 | 3/2022 | Burbank |
| 11,272,993 B2 | 3/2022 | Gomez et al. |
| 11,272,994 B2 | 3/2022 | Saraliev et al. |
| 11,291,442 B2 | 4/2022 | Wixey et al. |
| 11,291,513 B2 | 4/2022 | Manzo et al. |
| 11,357,584 B2 | 6/2022 | Xu et al. |
| 11,376,002 B2 | 7/2022 | Shelton, IV et al. |
| 11,376,098 B2 | 7/2022 | Shelton, IV et al. |
| 11,381,759 B2 | 7/2022 | Zhao et al. |
| 11,382,621 B2 | 7/2022 | Scheib et al. |
| 11,382,624 B2 | 7/2022 | Harris et al. |
| 11,382,625 B2 | 7/2022 | Huitema et al. |
| 11,382,626 B2 | 7/2022 | Shelton, IV et al. |
| 11,382,627 B2 | 7/2022 | Huitema et al. |
| 11,382,638 B2 | 7/2022 | Harris et al. |
| 11,382,644 B2 | 7/2022 | Schoettgen et al. |
| 11,389,160 B2 | 7/2022 | Shelton, IV et al. |
| 11,389,255 B2 | 7/2022 | DiMaio et al. |
| 11,399,906 B2 | 8/2022 | Shelton, IV et al. |
| 11,406,379 B2 | 8/2022 | Hess et al. |
| 11,410,259 B2 | 8/2022 | Harris et al. |
| 11,419,630 B2 | 8/2022 | Yates et al. |
| 11,424,027 B2 | 8/2022 | Shelton, IV |
| 11,432,888 B2 | 9/2022 | Diolaiti et al. |
| 11,432,893 B2 | 9/2022 | Itkowitz et al. |
| 11,432,895 B2 | 9/2022 | Loh et al. |
| 11,439,390 B2 | 9/2022 | Patel et al. |
| 11,439,391 B2 | 9/2022 | Bruns et al. |
| 11,468,791 B2 | 10/2022 | Jarc et al. |
| 11,471,155 B2 | 10/2022 | Shelton, IV et al. |
| 11,471,221 B2 | 10/2022 | Zhao et al. |
| 11,478,308 B2 | 10/2022 | Hoffman et al. |
| 11,490,977 B2 | 11/2022 | Schena et al. |
| 11,497,499 B2 | 11/2022 | Shelton, IV et al. |
| 11,504,119 B2 | 11/2022 | Shelton, IV et al. |
| 11,504,124 B2 | 11/2022 | Patel et al. |
| 11,510,743 B2 | 11/2022 | Shelton, IV et al. |
| 11,517,312 B2 | 12/2022 | Wixey |
| 11,517,325 B2 | 12/2022 | Shelton, IV et al. |
| 11,518,048 B2 | 12/2022 | Saraliev et al. |
| 11,602,401 B2 * | 3/2023 | Dozeman ............... B25J 9/1694 |
| 11,819,300 B2 * | 11/2023 | Bono .................... A61B 34/30 |
| 2010/0049268 A1 | 2/2010 | Martins |

* cited by examiner

SURGICAL ROBOTIC SYSTEM AND METHOD FOR RESTORING OPERATIONAL STATE

CROSS-REFERENCE TO RELATED APPLICATIONS

The present application claims the benefit of and priority to U.S. Provisional Patent Application Ser. No. 63/419,047, filed on Oct. 25, 2022, the entire contents of which being incorporated herein by reference.

BACKGROUND

Surgical robotic systems are currently being used in a variety of surgical procedures, including minimally invasive medical procedures. Some surgical robotic systems include a surgeon console controlling a surgical robotic arm and a surgical instrument having an end effector (e.g., forceps or grasping instrument) coupled to and actuated by the robotic arm. In operation, the robotic arm is moved to a position over a patient and then guides the surgical instrument into a small incision via a surgical port or a natural orifice of a patient to position the end effector at a work site within the patient's body. The surgical robotic systems may encounter unrecoverable faults requiring a restart of one or more of the components. This requires the operating staff to determine how to restore the system to a state just prior to the occurrence of the fault.

SUMMARY

One of the challenges to the operating staff using a surgical robotic system is managing multiple workstreams. This is particularly problematic in recovering from an error in the system. Occasionally, the system may encounter an error, e.g., due to a hardware, software, or user-generated fault. As a result, the recovery process may require the system, including some or all of its components (e.g., robotic arms, carts, console, instruments, instrument drive unit, etc.), to be reset by disconnecting and reconnecting components, restarting computing devices, etc. Once the system is reset, the system then needs to be placed into a state reflective of its configuration prior to the occurrence of the error. The present disclosure provides for a system and method providing the robotic system to recover from errors that require a restart of the system by generating and storing save points in its storage. The save points may include configuration details of the system and each of the components as well as the timestamp of the save point. The system may store save points continuously or in response to detection of a specific event or phase by the system or in response to a user request.

The restoration process may include rebooting the system, including its control tower, and/or one or more of the system's components, such as robotic arms, instruments, etc. After the reboot the system performs variety of safety checks and if successful, a save point is selected by a user through an interface, e.g., buttons and/or a graphical user interface (GUI), which is displayed on a monitor of the control tower or another monitor, allowing the user to select a suitable save point from a plurality of save points listed with the timestamp. In embodiments, the system may automatically select a suitable (e.g., most recent) save point. Once selected, the GUI guides the user through a process configuring the system and its components in a specific order until the system is restored to operational state prior to the occurrence of the fault. The orderly restoration process, with sequenced instructions, enables the operating staff to quickly restore the system to the operational state, thereby reducing disruption to the surgical procedure.

In one embodiment, a surgical robotic system is disclosed. The surgical robotic system includes a surgical robotic arm having an instrument and an instrument drive unit configured to actuate the instrument. The system also includes a surgeon console configured to receive user input to control at least one of the surgical robotic arm or the instrument, and a control tower coupled to the surgical robotic arm and the surgeon console. The control tower includes a storage device and a controller configured to store a save point on the storage device. The save point may include configuration data pertaining to at least one of the surgical robotic arm, the instrument drive unit, or the instrument. The controller is further configured to detect an error resulting in a reboot of at least one of the surgical robotic arm, the instrument drive unit, the instrument, the surgeon console, or the control tower. The controller is additionally configured to enter a recovery mode after the reboot of at least one of the surgical robotic arm, the instrument drive unit, the instrument, the surgeon console, or the control tower, and access the configuration data of the save point in the recovery mode. The controller is further configured to output a graphical user interface displaying instructions, which include at least one step for restoring at least one of the surgical robotic arm, the instrument drive unit, the instrument, the surgeon console, or the control tower based on the configuration data, and exit the recovery mode after confirmation the at least one step is completed based on one of user input or sensor feedback.

Implementations of the above embodiment may include one or more of the following features. According to one aspect of the above embodiment, the controller may be further configured to determine a phase of a surgical procedure being performed by the surgical robotic arm. The controller may be also configured to store the save point on the storage device based on the determination of a particular phase of the surgical procedure. The controller may be additionally configured to store the save point on the storage device in response to a user request. The at least one step of the instructions may include a graphical representation of at least one of the surgical robotic arm, the instrument drive unit, or the instrument to be moved into a position as indicated in the configuration data. The surgical robotic system may further include a mobile cart and the surgical robotic arm may be coupled to the mobile cart. The at least one step of the instructions may also include a graphical representation of the mobile cart including orientation of the mobile cart relative to a patient table.

In another embodiment, a surgical robotic system is disclosed. The surgical robotic system includes a surgical robotic arm having an instrument and an instrument drive unit configured to actuate the instrument. The system also includes a storage device and a controller configured to store a save point on the storage device, the save point including configuration data pertaining to at least one of the surgical robotic arm, the instrument drive unit, or the instrument. The controller is further configured to detect an error resulting in a reboot of the surgical robotic arm, the instrument drive unit, or the instrument. The controller is additionally configured to access the configuration data of the save point after the reboot of at least one of the surgical robotic arm, the instrument drive unit, or the instrument. The controller is also configured to output a graphical user interface including instructions for restoring at least one of the surgical robotic arm, the instrument drive unit, or the instrument based on the configuration data.

Implementations of the above embodiment may include one or more of the following features. According to one aspect of the above embodiment, the controller may be further configured to determine a phase of a surgical procedure being performed by the surgical robotic arm. The controller may be also configured to store the save point on the storage device based on the determination of a particular phase of the surgical procedure. The controller may be additionally configured to store the save point on the storage device in response to a user request. The instructions may include a graphical representation of at least one of the surgical robotic arm, the instrument drive unit, or the instrument to be moved into a position as indicated in the configuration data. The surgical robotic system may further include a mobile cart and the surgical robotic arm may be coupled to the mobile cart. The instructions may also include a graphical representation of the mobile cart and may include orientation of the mobile cart relative to a patient table.

In a further embodiment, a method for restoring an operational state of a surgical robotic system is disclosed. The surgical robotic system includes a surgeon console, a control tower, and a surgical robotic arm including an instrument and an instrument drive unit configured to actuate the instrument. The method includes storing a save point on a storage device, the save point including configuration data pertaining to at least one of the surgical robotic arm, the instrument drive unit, or the instrument. The method also includes detecting an error resulting in a reboot of at least one of the surgical robotic arm, the instrument drive unit, the instrument, the surgeon console, or the control tower. The method further includes entering a recovery mode after the reboot of at least one of the surgical robotic arm, the instrument drive unit, the instrument, the surgeon console, or the control tower, and accessing the configuration data of the save point in the recovery mode. The method additionally includes outputting a graphical user interface displaying instructions having at least one step for restoring at least one of the surgical robotic arm, the instrument drive unit, or the instrument based on the configuration data. The method further includes exiting the recovery mode after confirmation the at least one step is completed based on one of user input or sensor feedback.

Implementations of the above embodiment may include one or more of the following features. According to one aspect of the above embodiment, the method may further include determining a phase of a surgical procedure being performed by the surgical robotic arm. The save point may be stored based on the determination of a particular phase of the surgical procedure. The save point may be stored in response to a user request. The method may also include displaying a graphical representation of at least one of the surgical robotic arm, the instrument drive unit, or the instrument to be moved into a position as indicated in the configuration data. The method may additionally include displaying a graphical representation of a mobile cart coupled to the surgical robotic arm, the graphical representation may include orientation of the mobile cart relative to a patient table.

BRIEF DESCRIPTION OF THE DRAWINGS

Various embodiments of the present disclosure are described herein with reference to the drawings wherein.

DETAILED DESCRIPTION

Figure 1:
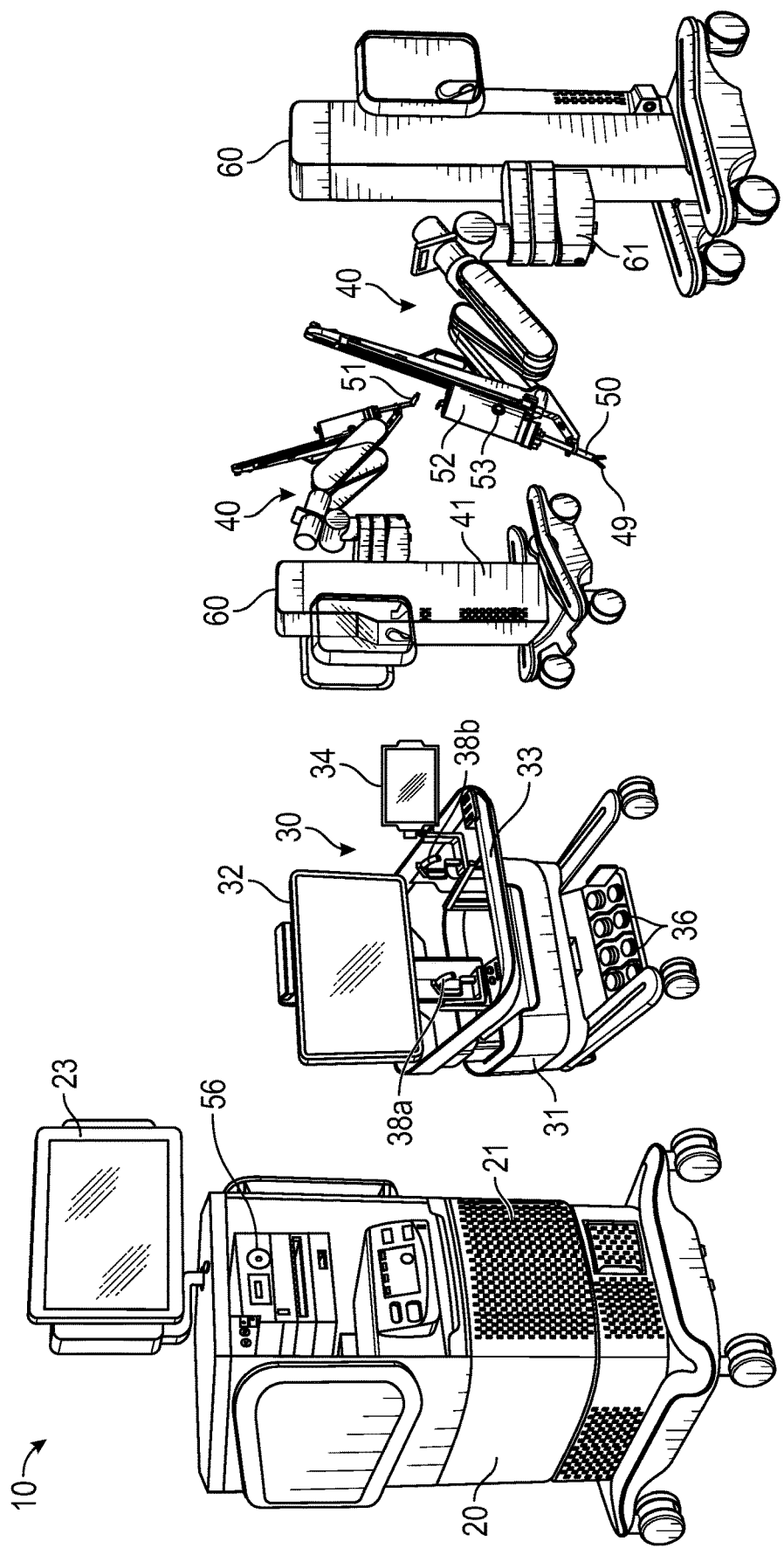
FIG. 1 is a schematic illustration of a surgical robotic system including a control tower, a console, and one or more surgical robotic arms each disposed on a mobile cart according to an embodiment of the present disclosure.

Embodiments of the presently disclosed surgical robotic system are described in detail with reference to the drawings, in which like reference numerals designate identical or corresponding elements in each of the several views.

As will be described in detail below, the present disclosure is directed to a surgical robotic system, which includes a surgeon console, a control tower, and one or more mobile carts having a surgical robotic arm coupled to a setup arm. The surgeon console receives user input through one or more interface devices, which are processed by the control tower as movement commands for moving the surgical robotic arm and an instrument and/or camera coupled thereto. Thus, the surgeon console enables teleoperation of the surgical arms and attached instruments/camera. The surgical robotic arm includes a controller, which is configured to process the movement commands and to generate torque commands for activating one or more actuators of the robotic arm, which would, in turn, move the robotic arm in response to the movement command.

With reference to FIG. 1, a surgical robotic system 10 includes a control tower 20, which is connected to all of the components of the surgical robotic system 10 including a surgeon console 30 and one or more mobile carts 60. Each of the mobile carts 60 includes a robotic arm 40 having a surgical instrument 50 removably coupled thereto. The robotic arms 40 also couple to the mobile carts 60. The robotic system 10 may include any number of mobile carts 60 and/or robotic arms 40.

The surgical instrument 50 is configured for use during minimally invasive surgical procedures. In embodiments, the surgical instrument 50 may be configured for open surgical procedures. In further embodiments, the surgical instrument 50 may be an electrosurgical forceps configured to seal tissue by compressing tissue between jaw members and applying electrosurgical current thereto. In yet further embodiments, the surgical instrument 50 may be a surgical stapler including a pair of jaws configured to grasp and clamp tissue while deploying a plurality of tissue fasteners, e.g., staples, and cutting stapled tissue. In yet further embodiments, the surgical instrument 50 may be a surgical clip applier including a pair of jaws configured apply a surgical clip onto tissue.

One of the robotic arms 40 may include a laparoscopic camera 51 configured to capture video of the surgical site. The laparoscopic camera 51 may be a stereoscopic endoscope configured to capture two side-by-side (i.e., left and right) images of the surgical site to produce a video stream of the surgical scene. The laparoscopic camera 51 is coupled to an image processing device 56, which may be disposed within the control tower 20. The image processing device 56 may be any computing device configured to receive the video feed from the laparoscopic camera 51 and output the processed video stream.

The surgeon console 30 includes a first screen 32, which displays a video feed of the surgical site provided by camera 51 of the surgical instrument 50 disposed on the robotic arm 40, and a second screen 34, which displays a user interface for controlling the surgical robotic system 10. The first screen 32 and second screen 34 may be touchscreens allowing for displaying various graphical user inputs.

The surgeon console 30 also includes a plurality of user interface devices, such as foot pedals 36 and a pair of hand controllers 38a and 38b which are used by a user to remotely control robotic arms 40. The surgeon console further includes an armrest 33 used to support clinician's arms while operating the hand controllers 38a and 38b.

The control tower 20 includes a screen 23, which may be a touchscreen, and outputs on the graphical user interfaces (GUIs). The control tower 20 also acts as an interface between the surgeon console 30 and one or more robotic arms 40. In particular, the control tower 20 is configured to control the robotic arms 40, such as to move the robotic arms 40 and the corresponding surgical instrument 50, based on a set of programmable instructions and/or input commands from the surgeon console 30, in such a way that robotic arms 40 and the surgical instrument 50 execute a desired movement sequence in response to input from the foot pedals 36 and the hand controllers 38a and 38b. The foot pedals 36 may be used to enable and lock the hand controllers 38a and 38b, repositioning camera movement and electrosurgical activation/deactivation. In particular, the foot pedals 36 may be used to perform a clutching action on the hand controllers 38a and 38b. Clutching is initiated by pressing one of the foot pedals 36, which disconnects (i.e., prevents movement inputs) the hand controllers 38a and/or 38b from the robotic arm 40 and corresponding instrument 50 or camera 51 attached thereto. This allows the user to reposition the hand controllers 38a and 38b without moving the robotic arm(s) 40 and the instrument 50 and/or camera 51. This is useful when reaching control boundaries of the surgical space.

Each of the control tower 20, the surgeon console 30, and the robotic arm 40 includes a respective computer 21, 31, 41. The computers 21, 31, 41 are interconnected to each other using any suitable communication network based on wired or wireless communication protocols. The term "network," whether plural or singular, as used herein, denotes a data network, including, but not limited to, the Internet, Intranet, a wide area network, or a local area network, and without limitation as to the full scope of the definition of communication networks as encompassed by the present disclosure. Suitable protocols include, but are not limited to, transmission control protocol/internet protocol (TCP/IP), datagram protocol/internet protocol (UDP/IP), and/or datagram congestion control protocol (DC). Wireless communication may be achieved via one or more wireless configurations, e.g., radio frequency, optical, Wi-Fi, Bluetooth (an open wireless protocol for exchanging data over short distances, using short length radio waves, from fixed and mobile devices, creating personal area networks (PANs), ZigBee® (a specification for a suite of high level communication protocols using small, low-power digital radios based on the IEEE 122.15.4-1203 standard for wireless personal area networks (WPANs)).

The computers 21, 31, 41 may include any suitable processor (not shown) operably connected to a memory (not shown), which may include one or more of volatile, non-volatile, magnetic, optical, or electrical media, such as read-only memory (ROM), random access memory (RAM), electrically-erasable programmable ROM (EEPROM), non-volatile RAM (NVRAM), or flash memory. The processor may be any suitable processor (e.g., control circuit) adapted to perform the operations, calculations, and/or set of instructions described in the present disclosure including, but not limited to, a hardware processor, a field programmable gate array (FPGA), a digital signal processor (DSP), a central processing unit (CPU), a microprocessor, and combinations thereof. Those skilled in the art will appreciate that the processor may be substituted for by using any logic processor (e.g., control circuit) adapted to execute algorithms, calculations, and/or set of instructions described herein.

Figure 2:
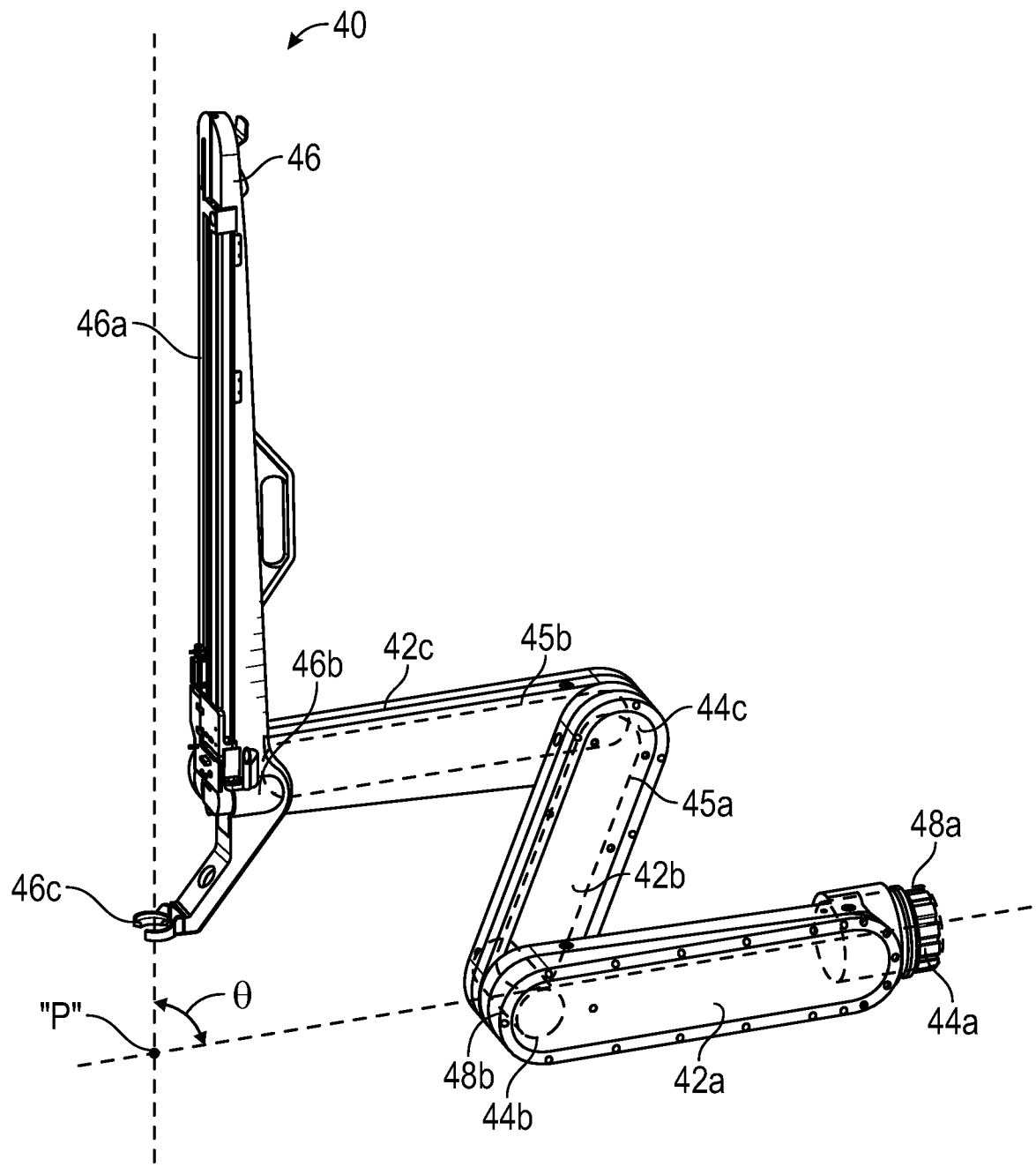
FIG. 2 is a perspective view of a surgical robotic arm of the surgical robotic system of FIG. 1 according to an embodiment of the present disclosure.
Figure 3:
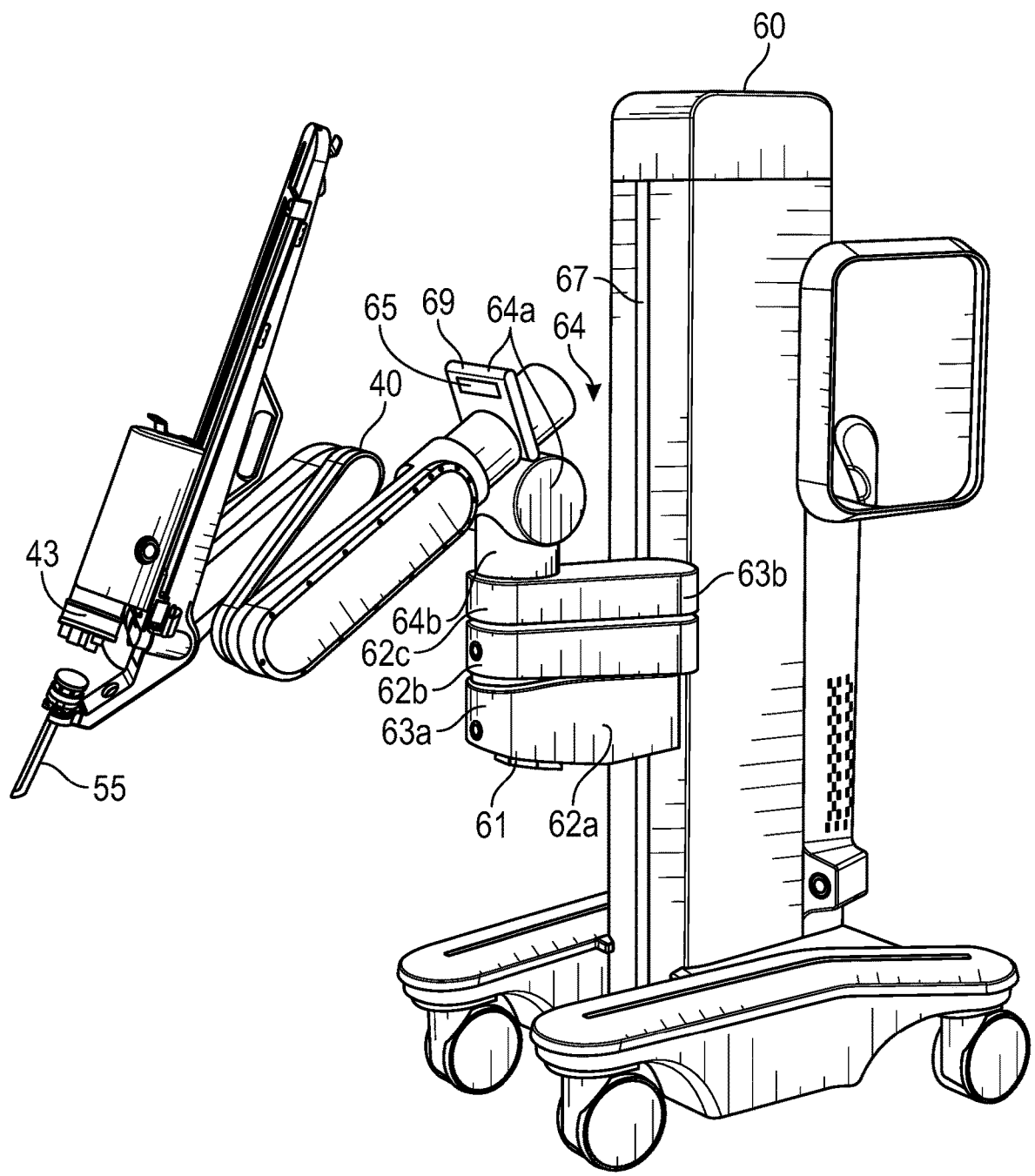
FIG. 3 is a perspective view of a mobile cart having a setup arm with the surgical robotic arm of the surgical robotic system of FIG. 1 according to an embodiment of the present disclosure.

With reference to FIG. 2, each of the robotic arms 40 may include a plurality of links 42a, 42b, 42c, which are interconnected at joints 44a, 44b, 44c, respectively. Other configurations of links and joints may be utilized as known by those skilled in the art. The joint 44a is configured to secure the robotic arm 40 to the mobile cart 60 and defines a first longitudinal axis. With reference to FIG. 3, the mobile cart 60 includes a lift 67 and a setup arm 61, which provides a base for mounting of the robotic arm 40. The lift 67 allows for vertical movement of the setup arm 61. The mobile cart 60 also includes a screen 69 for displaying information pertaining to the robotic arm 40. In embodiments, the robotic arm 40 may include any type and/or number of joints.

The setup arm 61 includes a first link 62a, a second link 62b, and a third link 62c, which provide for lateral maneuverability of the robotic arm 40. The links 62a, 62b, 62c are interconnected at joints 63a and 63b, each of which may include an actuator (not shown) for rotating the links 62b and 62b relative to each other and the link 62c. In particular, the links 62a, 62b, 62c are movable in their corresponding lateral planes that are parallel to each other, thereby allowing for extension of the robotic arm 40 relative to the patient (e.g., surgical table). In embodiments, the robotic arm 40 may be coupled to the surgical table (not shown). The setup arm 61 includes controls 65 for adjusting movement of the links 62a, 62b, 62c as well as the lift 67. In embodiments, the setup arm 61 may include any type and/or number of joints.

The third link 62c may include a rotatable base 64 having two degrees of freedom. In particular, the rotatable base 64 includes a first actuator 64a and a second actuator 64b. The first actuator 64a is rotatable about a first stationary arm axis which is perpendicular to a plane defined by the third link 62c and the second actuator 64b is rotatable about a second stationary arm axis which is transverse to the first stationary arm axis. The first and second actuators 64a and 64b allow for full three-dimensional orientation of the robotic arm 40.

The actuator 48b of the joint 44b is coupled to the joint 44c via the belt 45a, and the joint 44c is in turn coupled to the joint 46b via the belt 45b. Joint 44c may include a transfer case coupling the belts 45a and 45b, such that the actuator 48b is configured to rotate each of the links 42b, 42c and a holder 46 relative to each other. More specifically, links 42b, 42c, and the holder 46 are passively coupled to the actuator 48b which enforces rotation about a pivot point "P" which lies at an intersection of the first axis defined by the link 42a and the second axis defined by the holder 46. In other words, the pivot point "P" is a remote center of motion (RCM) for the robotic arm 40. Thus, the actuator 48b controls the angle θ between the first and second axes allowing for orientation of the surgical instrument 50. Due to the interlinking of the links 42a, 42b, 42c, and the holder 46 via the belts 45a and 45b, the angles between the links 42a, 42b, 42c, and the holder 46 are also adjusted in order to achieve the desired angle θ. In embodiments, some or all of the joints 44a, 44b, 44c may include an actuator to obviate the need for mechanical linkages.

The joints 44a and 44b include an actuator 48a and 48b configured to drive the joints 44a, 44b, 44c relative to each other through a series of belts 45a and 45b or other mechanical linkages such as a drive rod, a cable, or a lever and the like. In particular, the actuator 48a is configured to rotate the robotic arm 40 about a longitudinal axis defined by the link 42a.

With reference to FIG. 2, the holder 46 defines a second longitudinal axis and configured to receive an instrument drive unit (IDU) 52 (FIG. 1). The IDU 52 is configured to couple to an actuation mechanism of the surgical instrument 50 and the camera 51 and is configured to move (e.g., rotate) and actuate the instrument 50 and/or the camera 51. IDU 52 transfers actuation forces from its actuators to the surgical instrument 50 to actuate components an end effector 49 of the surgical instrument 50. The holder 46 includes a sliding mechanism 46a, which is configured to move the IDU 52 along the second longitudinal axis defined by the holder 46. The holder 46 also includes a joint 46b, which rotates the holder 46 relative to the link 42c. During endoscopic procedures, the instrument 50 may be inserted through an endoscopic access port 55 (FIG. 3) held by the holder 46. The holder 46 also includes a port latch 46c for securing the access port 55 to the holder 46 (FIG. 2).

The robotic arm 40 also includes a plurality of manual override buttons 53 (FIG. 1) disposed on the IDU 52 and the setup arm 61, which may be used in a manual mode. The user may press one or more of the buttons 53 to move the component associated with the button 53.

Figure 4:
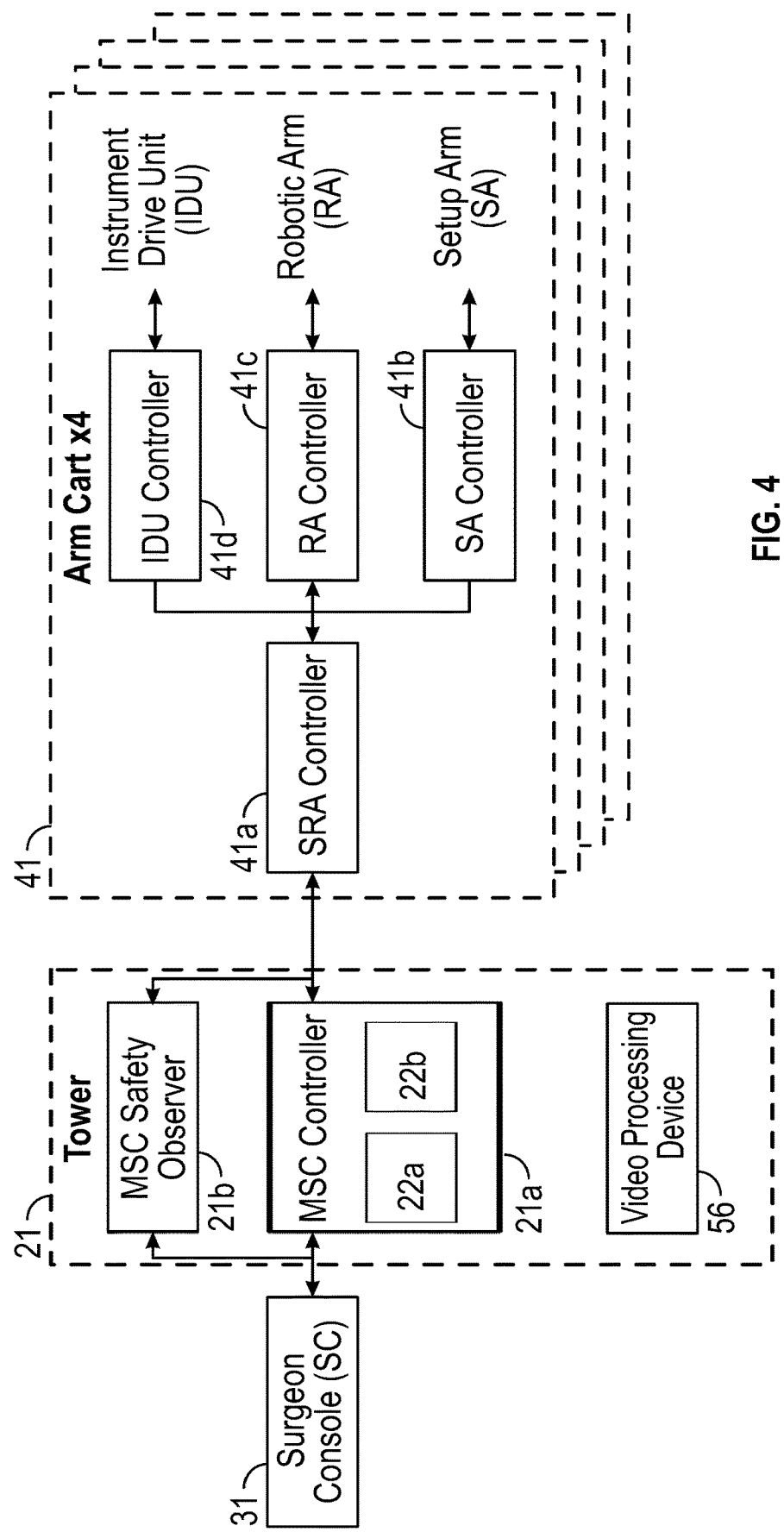
FIG. 4 is a schematic diagram of a computer architecture of the surgical robotic system of FIG. 1 according to an embodiment of the present disclosure.

With reference to FIG. 4, each of the computers 21, 31, 41 of the surgical robotic system 10 may include a plurality of controllers, which may be embodied in hardware and/or software. The computer 21 of the control tower 20 includes a controller 21a and safety observer 21b. The controller 21a receives data from the computer 31 of the surgeon console 30 about the current position and/or orientation of the hand controllers 38a and 38b and the state of the foot pedals 36 and other buttons. The controller 21a processes these input positions to determine desired drive commands for each joint of the robotic arm 40 and/or the IDU 52 and communicates these to the computer 41 of the robotic arm 40. The controller 21a also receives the actual joint angles measured by encoders of the actuators 48a and 48b and uses this information to determine force feedback commands that are transmitted back to the computer 31 of the surgeon console 30 to provide haptic feedback through the hand controllers 38a and 38b. The safety observer 21b performs validity checks on the data going into and out of the controller 21a and notifies a system fault handler if errors in the data transmission are detected to place the computer 21 and/or the surgical robotic system 10 into a safe state.

The controller 21a is coupled to a storage 22a, which may be non-transitory computer-readable medium configured to store any suitable computer data, such as software instructions executable by the controller 21a. The controller 21a also includes transitory memory 22b for loading instructions and other computer readable data during execution of the instructions. In embodiments, other controllers of the system 10 include similar configurations.

The computer 41 includes a plurality of controllers, namely, a main cart controller 41a, a setup arm controller 41b, a robotic arm controller 41c, and an instrument drive unit (IDU) controller 41d. The main cart controller 41a receives and processes joint commands from the controller 21a of the computer 21 and communicates them to the setup arm controller 41b, the robotic arm controller 41c, and the IDU controller 41d. The main cart controller 41a also manages instrument exchanges and the overall state of the mobile cart 60, the robotic arm 40, and the IDU 52. The main cart controller 41a also communicates actual joint angles back to the controller 21a.

Each of joints 63a and 63b and the rotatable base 64 of the setup arm 61 are passive joints (i.e., no actuators are present therein) allowing for manual adjustment thereof by a user. The joints 63a and 63b and the rotatable base 64 include brakes that are disengaged by the user to configure the setup arm 61. The setup arm controller 41b monitors slippage of each of joints 63a and 63b and the rotatable base 64 of the setup arm 61, when brakes are engaged or can be freely moved by the operator when brakes are disengaged, but do not impact controls of other joints. The robotic arm controller 41c controls each joint 44a and 44b of the robotic arm 40 and calculates desired motor torques required for gravity compensation, friction compensation, and closed loop position control of the robotic arm 40. The robotic arm controller 41c calculates a movement command based on the calculated torque. The calculated motor commands are then communicated to one or more of the actuators 48a and 48b in the robotic arm 40. The actual joint positions are then transmitted by the actuators 48a and 48b back to the robotic arm controller 41c.

The IDU controller 41d receives desired joint angles for the surgical instrument 50, such as wrist and jaw angles, and computes desired currents for the motors in the IDU 52. The IDU controller 41d calculates actual angles based on the motor positions and transmits the actual angles back to the main cart controller 41a.

The robotic arm 40 is controlled in response to a pose of the hand controller controlling the robotic arm 40, e.g., the hand controller 38a, which is transformed into a desired pose of the robotic arm 40 through a hand eye transform function executed by the controller 21a. The hand eye function, as well as other functions described herein, is/are embodied in software executable by the controller 21a or any other suitable controller described herein. The pose of one of the hand controllers 38a may be embodied as a coordinate position and roll-pitch-yaw (RPY) orientation relative to a coordinate reference frame, which is fixed to the surgeon console 30. The desired pose of the instrument 50 is relative to a fixed frame on the robotic arm 40. The pose of the hand controller 38a is then scaled by a scaling function executed by the controller 21a. In embodiments, the coordinate position may be scaled down and the orientation may be scaled up by the scaling function. In addition, the controller 21a may also execute a clutching function, which disengages the hand controller 38a from the robotic arm 40. In particular, the controller 21a stops transmitting movement commands from the hand controller 38a to the robotic arm 40 if certain movement limits or other thresholds are exceeded and in essence acts like a virtual clutch mechanism, e.g., limits mechanical input from effecting mechanical output.

The desired pose of the robotic arm 40 is based on the pose of the hand controller 38a and is then passed by an inverse kinematics function executed by the controller 21a. The inverse kinematics function calculates angles for the joints 44a, 44b, 44c of the robotic arm 40 that achieve the scaled and adjusted pose input by the hand controller 38a. The calculated angles are then passed to the robotic arm controller 41c, which includes a joint axis controller having a proportional-derivative (PD) controller, the friction estimator module, the gravity compensator module, and a two-sided saturation block, which is configured to limit the commanded torque of the motors of the joints 44a, 44b, 44c.

Figure 5:
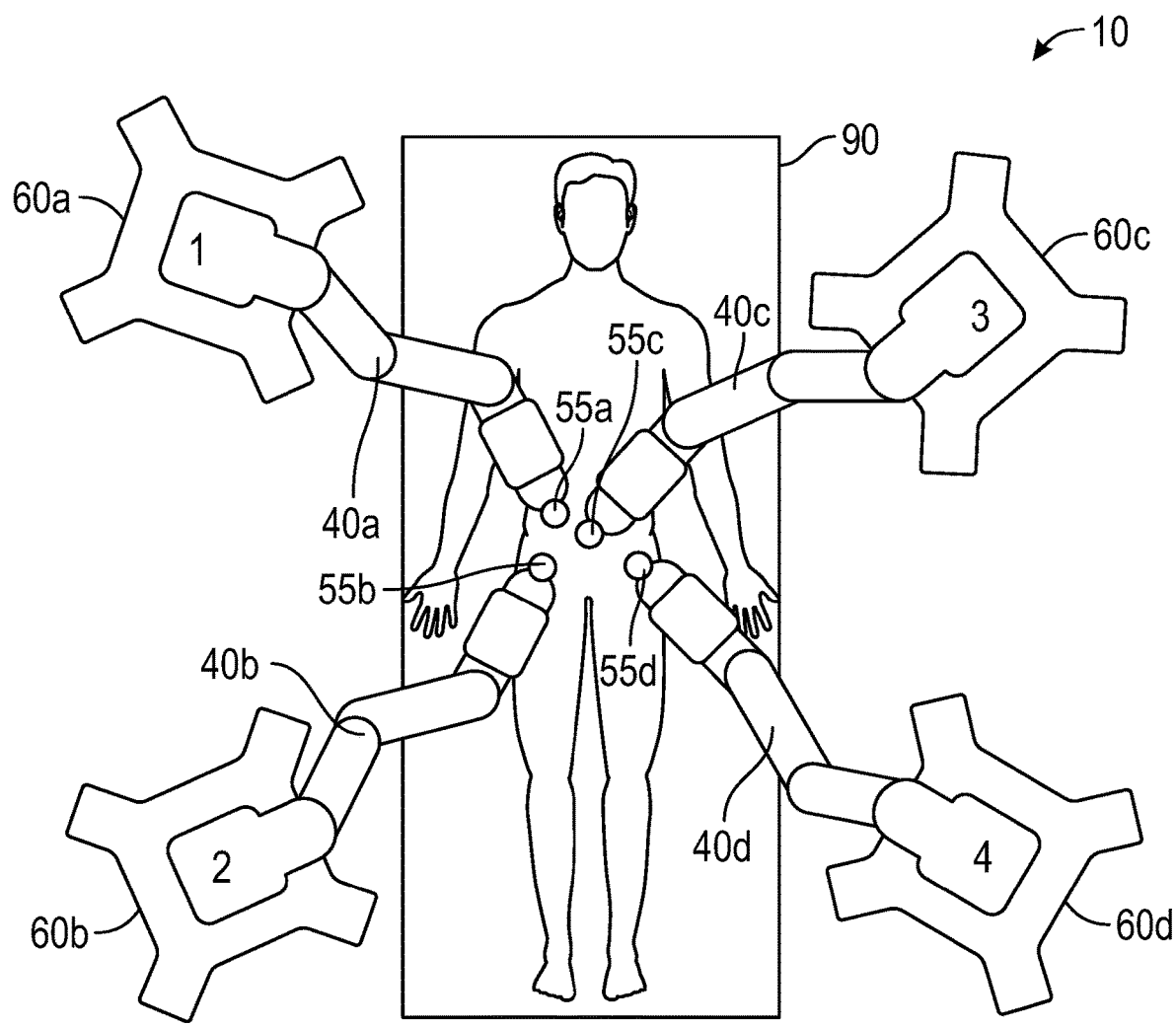
FIG. 5 is a plan schematic view of the surgical robotic system of FIG. 1 positioned about a surgical table according to an embodiment of the present disclosure.

With reference to FIG. 5, the surgical robotic system 10 is setup around a surgical table 90. The system 10 includes mobile carts 60a-d, which may be numbered "1" through "4." During setup, each of the carts 60a-d are positioned around the surgical table 90. Position and orientation of the carts 60a-d depends on a plurality of factors, such as placement of a plurality of access ports 55a-d, which in turn, depends on the surgery being performed. Once the port placement is determined, the access ports 55a-d are inserted into the patient, and carts 60a-d are positioned to insert instruments 50 and the laparoscopic camera 51 into corresponding ports 55a-d.

During use, each of the robotic arms 40a-d is attached to one of the access ports 55a-d that is inserted into the patient by attaching the latch 46c (FIG. 2) to the access port 55 (FIG. 3). The IDU 52 is attached to the holder 46, followed by the SIM 43 being attached to a distal portion of the IDU 52. Thereafter, the instrument 50 is attached to the SIM 43. The instrument 50 is then inserted through the access port 55 by moving the IDU 52 along the holder 46. The SIM 43 includes a plurality of drive shafts configured to transmit rotation of individual motors of the IDU 52 to the instrument 50 thereby actuating the instrument 50. In addition, the SIM 43 provides a sterile barrier between the instrument 50 and the other components of robotic arm 40, including the IDU 52. The SIM 43 is also configured to secure a sterile drape (not shown) to the IDU 52.

Figure 6:
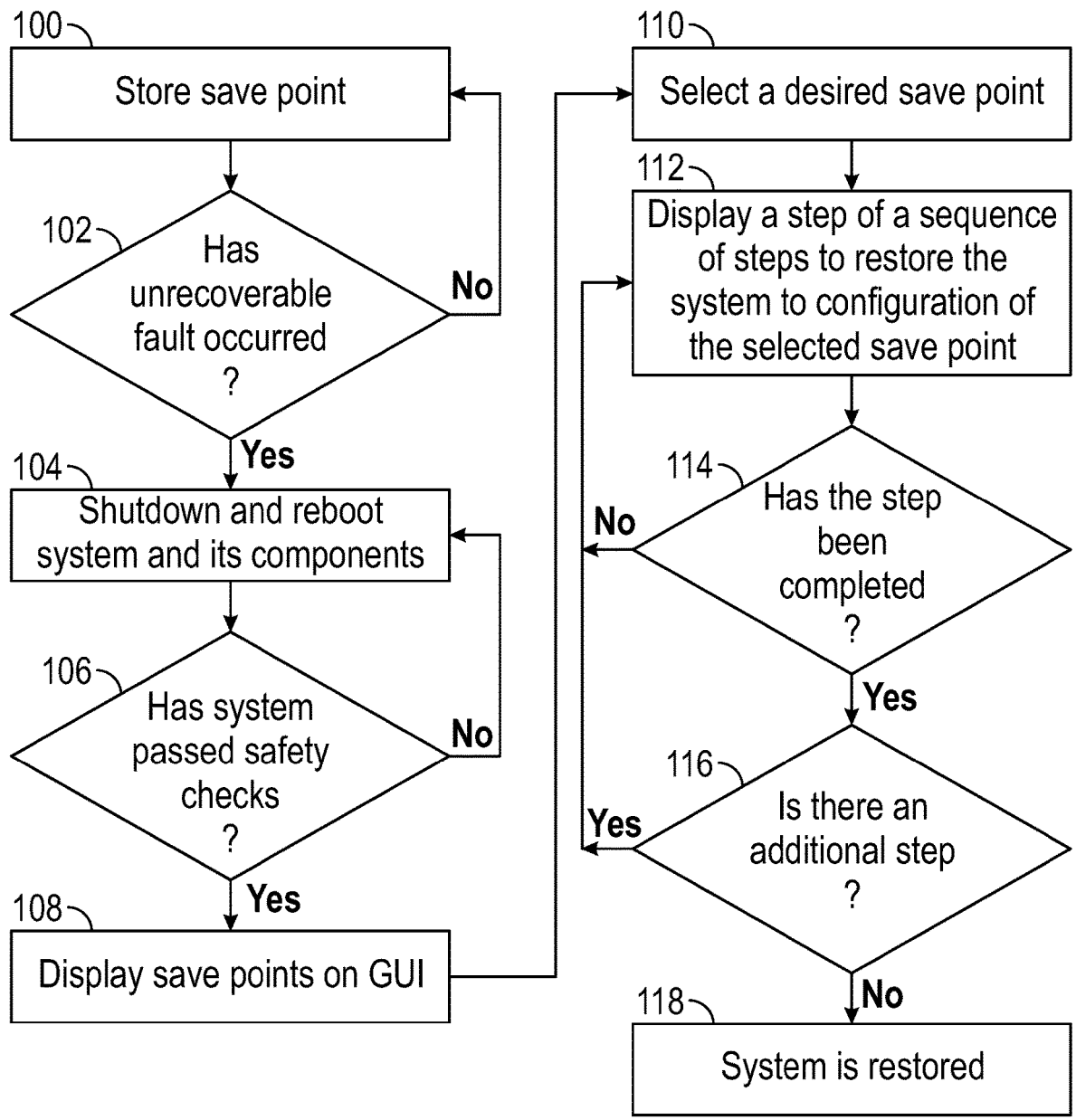
FIG. 6, is a flow chart illustrating a method for storing and restoring operational state of the surgical robotic system according to an embodiment of the present disclosure.

With reference to FIG. 6, a method for storing and restoring an operational state of the surgical robotic system 10 includes storing one or more save points in the storage 22a at step 100. The save point includes a time stamp indicating when the save point was generated as well as configuration data for the system 10. Configuration data may include orientation and position of the robotic arms 40, e.g., joint angle, arm height, angle relative to the table 90. The save points may be stored either manually, i.e., in response to the user commanding a save point or automatically, e.g., periodically, e.g., every minute, or based on phase detection, e.g., upon detection of a specific phase.

A surgical procedure may include multiple phases, and each phase may include one or more surgical actions. As used herein, the term "phase" represents a surgical event that is composed of a series of steps (e.g., closure). A "surgical action" may include an incision, a compression, a stapling, a clipping, a suturing, a cauterization, a sealing, or any other such actions performed to complete a phase in the surgical procedure. A "step" refers to the completion of a named surgical objective (e.g., hemostasis). During each step, certain surgical instruments 50 (e.g., forceps) are used to achieve a specific objective by performing one or more surgical actions.

Figure 7:
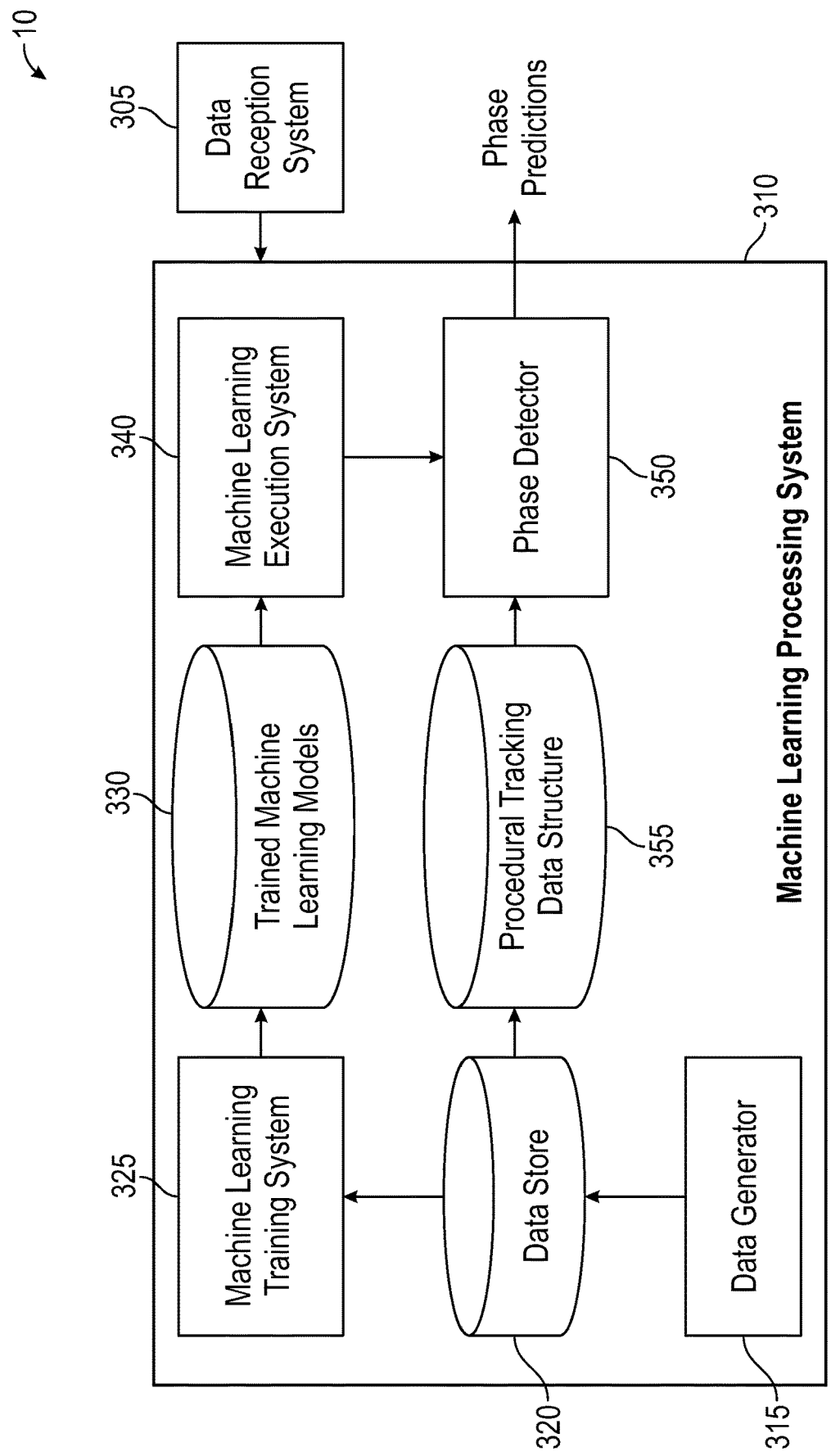
FIG. 7 is a schematic diagram of a system for determining phases of a surgical procedure according to an embodiment of the present disclosure.

With reference to FIG. 7, the surgical robotic system 10 may include a machine learning (ML) processing system 310 that processes the surgical data using one or more ML models to identify one or more features, such as surgical phase, instrument, anatomical structure, etc., in the surgical data. The ML processing system 310 includes a ML training system 325, which may be a separate device (e.g., server) that stores its output as one or more trained ML models 330. The ML models 330 are accessible by a ML execution system 340. The ML execution system 340 may be separate from the ML training system 325, namely, devices that "train" the models are separate from devices that "infer," i.e., perform real-time processing of surgical data using the trained ML models 330.

System 10 includes a data reception system 305 that collects surgical data, including the video data and surgical instrumentation data. The data reception system 305 can include one or more devices (e.g., one or more user devices and/or servers) located within and/or associated with a surgical operating room and/or control center. The data reception system 305 can receive surgical data in real-time, i.e., as the surgical procedure is being performed.

The ML processing system 310, in some examples, may further include a data generator 315 to generate simulated surgical data, such as a set of virtual images, or record the video data from the video processing device 56, to train the ML models 330 as well as other sources of data, e.g., user input, arm movement, etc. Data generator 315 can access (read/write) a data store 320 to record data, including multiple images and/or multiple videos.

The ML processing system 310 also includes a phase detector 350 that uses the ML models to identify a phase within the surgical procedure ("procedure"). Phase detector 350 uses a particular procedural tracking data structure 355 from a list of procedural tracking data structures. Phase detector 350 selects the procedural tracking data structure 355 based on the type of surgical procedure that is being performed. In one or more examples, the type of surgical procedure is predetermined or input by user. The procedural tracking data structure 355 identifies a set of potential phases that may correspond to a part of the specific type of procedure.

In some examples, the procedural tracking data structure 355 may be a graph that includes a set of nodes and a set of edges, with each node corresponding to a potential phase. The edges may provide directional connections between nodes that indicate (via the direction) an expected order during which the phases will be encountered throughout an iteration of the procedure. The procedural tracking data structure 355 may include one or more branching nodes that feed to multiple next nodes and/or may include one or more points of divergence and/or convergence between the nodes. In some instances, a phase indicates a procedural action (e.g., surgical action) that is being performed or has been performed and/or indicates a combination of actions that have been performed. In some instances, a phase relates to a biological state of a patient undergoing a surgical procedure. For example, the biological state may indicate a complication (e.g., blood clots, clogged arteries/veins, etc.), pre-condition (e.g., lesions, polyps, etc.). In some examples, the ML models 330 are trained to detect an "abnormal condition," such as hemorrhaging, arrhythmias, blood vessel abnormality, etc.

The phase detector 350 outputs the phase prediction associated with a portion of the video data that is analyzed by the ML processing system 310. The phase prediction is associated with the portion of the video data by identifying a start time and an end time of the portion of the video that is analyzed by the ML execution system 340. The phase prediction that is output may include an identity of a surgical phase as detected by the phase detector 350 based on the output of the ML execution system 340. Further, the phase prediction, in one or more examples, may include identities of the structures (e.g., instrument, anatomy, etc.) that are identified by the ML execution system 340 in the portion of the video that is analyzed. The phase prediction may also include a confidence score of the prediction. Other examples may include various other types of information in the phase prediction that is output. The predicted phase may be used by the controller 21a to determine that a save point needs to be saved and generated. Thus, when an abnormal condition is detected, the controller 21a may generate a save point. In further embodiments, a save point may be generated at the start of each phase.

The system 10 includes a watchdog process that continuously monitors whether the system 10 has encountered an error at step 102. It is envisioned that the system 10 may encounter a variety of errors that may be detected and processed using an error handler process executed by one or more of the controllers of the system 10, e.g., controller 21a. In response to the error, the controller 21a may output that the system 10 has encountered this error on one or more of the screens 23, 32, 34 and/or output an audio alarm.

Thereafter at step 104, the system 10 shuts down automatically or manually, e.g., in response to user pressing the "OFF" switch. In embodiments, the operating room staff may also retract all of the instruments 50 and the camera 51 from the access ports 55a-d, decouple the robotic arms 40a-d from the access ports 55a-d, move the carts 60a-d from the table 90, and any other steps to decouple the system 10 from the patient. This is done to allow the system 10 to reboot safely without inadvertently injuring the patient during the restart process.

The system 10 then restarts and performs safety checks and goes through other startup processes at step 106. If the safety checks are not successful, then the system 10 may not be used to continue the procedure. If they are, at step 106, the controller 21a enters a recovery mode in which a graphical user interface (GUI) 200 is displayed on one of the screens 23, 32, 34, enabling the user to walkthrough the restoration process.

Figure 8:
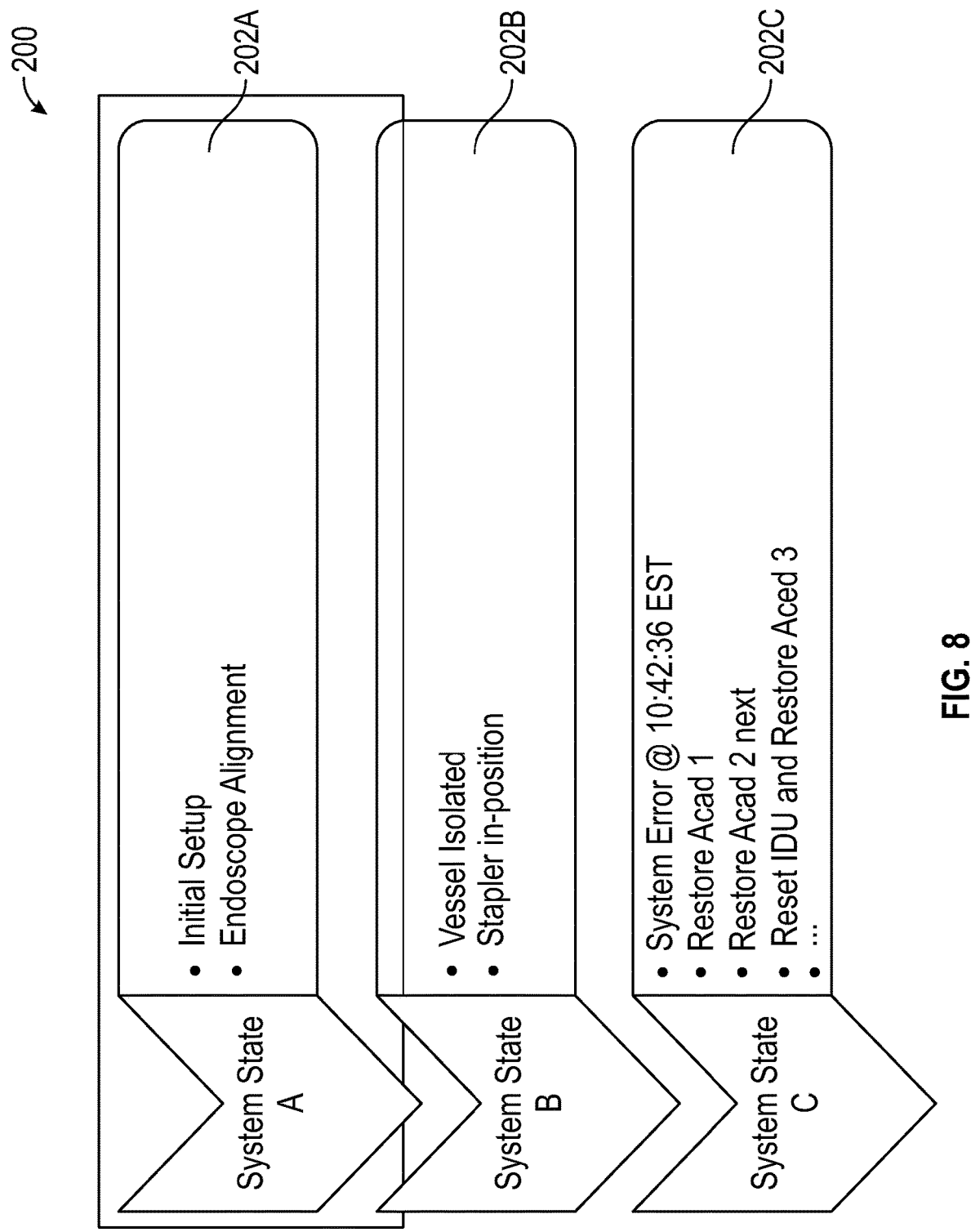
FIG. 8 is an image of a graphical user interface (GUI) for restoring the surgical robotic system according to an embodiment of the present disclosure.

At the start of the restoration process, a desired save point is selected either automatically or manually, e.g., in response to user input. For manual selection, at step 108, save points 202a-c may be displayed on the GUI 200 as shown in FIG. 8, listing a system state associated with each of the save points. Automatic selection may be done by the controller 21a by restoring the most recent save point or the controller 21a may choose the most optimal save point based on a variety of preselected criteria or the phase of the surgical procedure as determined by the ML processing system 310. At step 110, a desired save point is selected as noted above.

Figure 9:
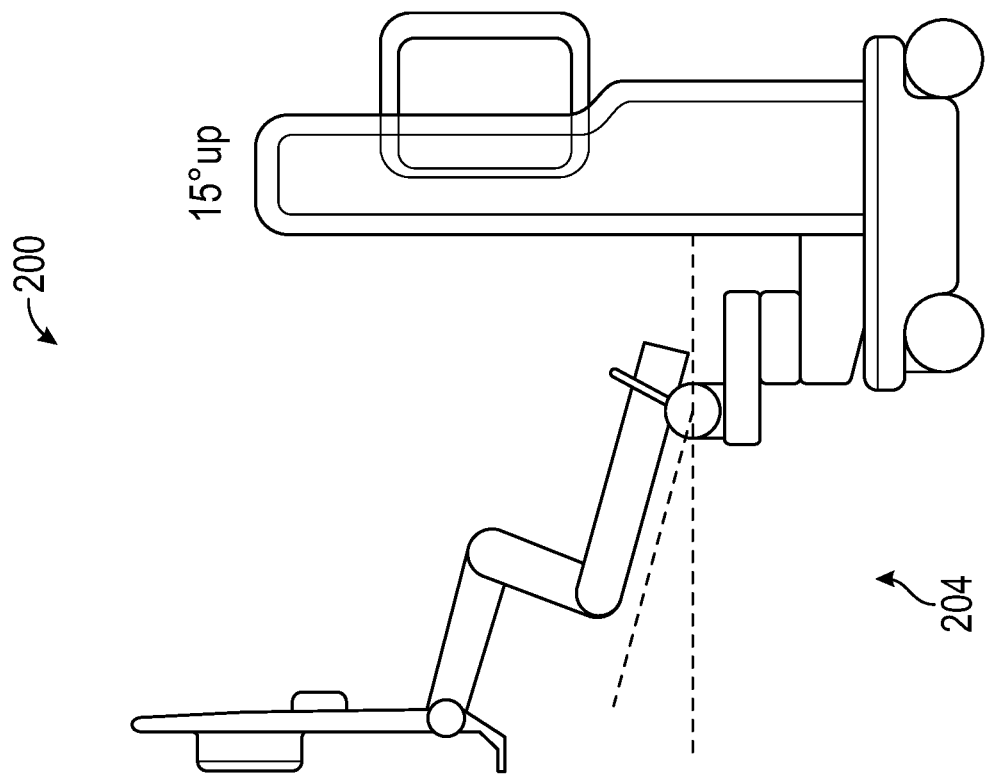
FIG. 9 is another image of the GUI for restoring the surgical robotic system according to an embodiment of the present disclosure.
Figure 9:
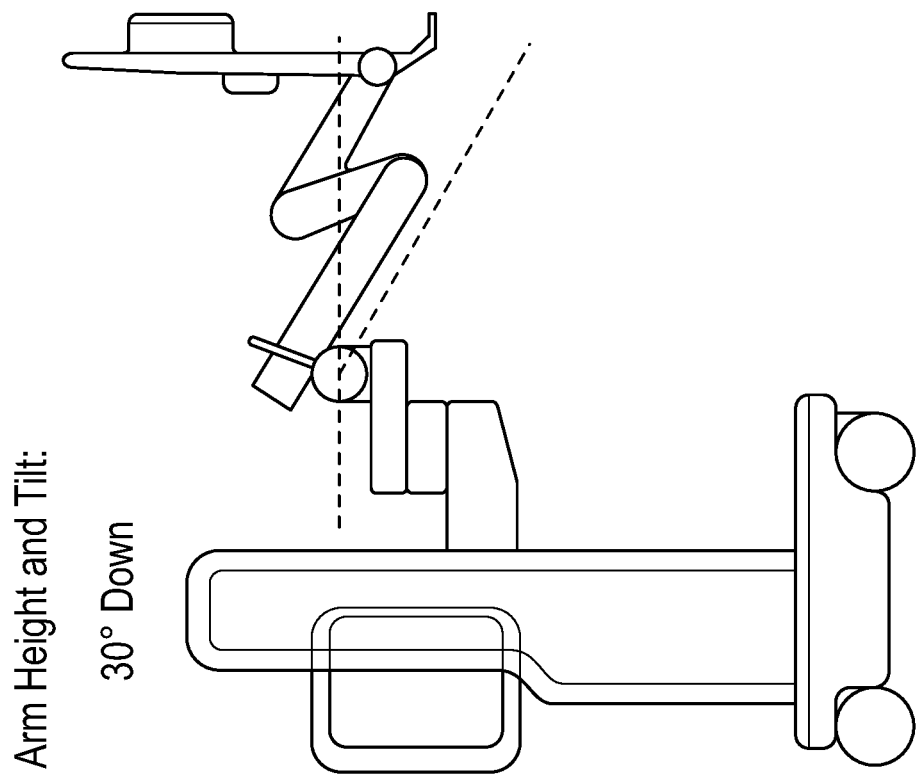

After a save point is selected, the controller 21a reads the configuration data from the save point and displays on the GUI 200, steps for the operating staff to restore the system 10 to the selected save point at step 112. With reference to FIG. 9, the GUI 200 may display instructions on one or more of the screens 23, 32, 34 and may include graphical representations 204 of the components of the system 10 that are being moved to the positions corresponding to the configuration data of the save point. The instructions may be displayed in a predetermined sequence, e.g., move robotic arm 40 into position, reset IDU 52, couple instrument 50 to IDU 52, etc. For each step of the sequence, the controller 21a may confirm whether the step has been completed at step 114 by requesting user confirmation (e.g., responding to a prompt on the GUI 200) and/or receiving sensor data that the step has been completed. Thus, verification of joint angle position may be verified via joint angles measured by encoders of the actuators of the robotic arm 40. Similarly, IDU 52 may be confirmed by establishing communication therewith and likewise with the coupling of the instrument 50. The controller 21a continues to display instructions for restoring the system 10 until the robotic arm 40 achieves the pose stored in the configuration data and/or the user confirms. The controller 21a may not advance to the subsequent step, e.g., coupling the robotic arms 40a-d to the access ports 50a-d, until confirmation is received.

Figure 10:
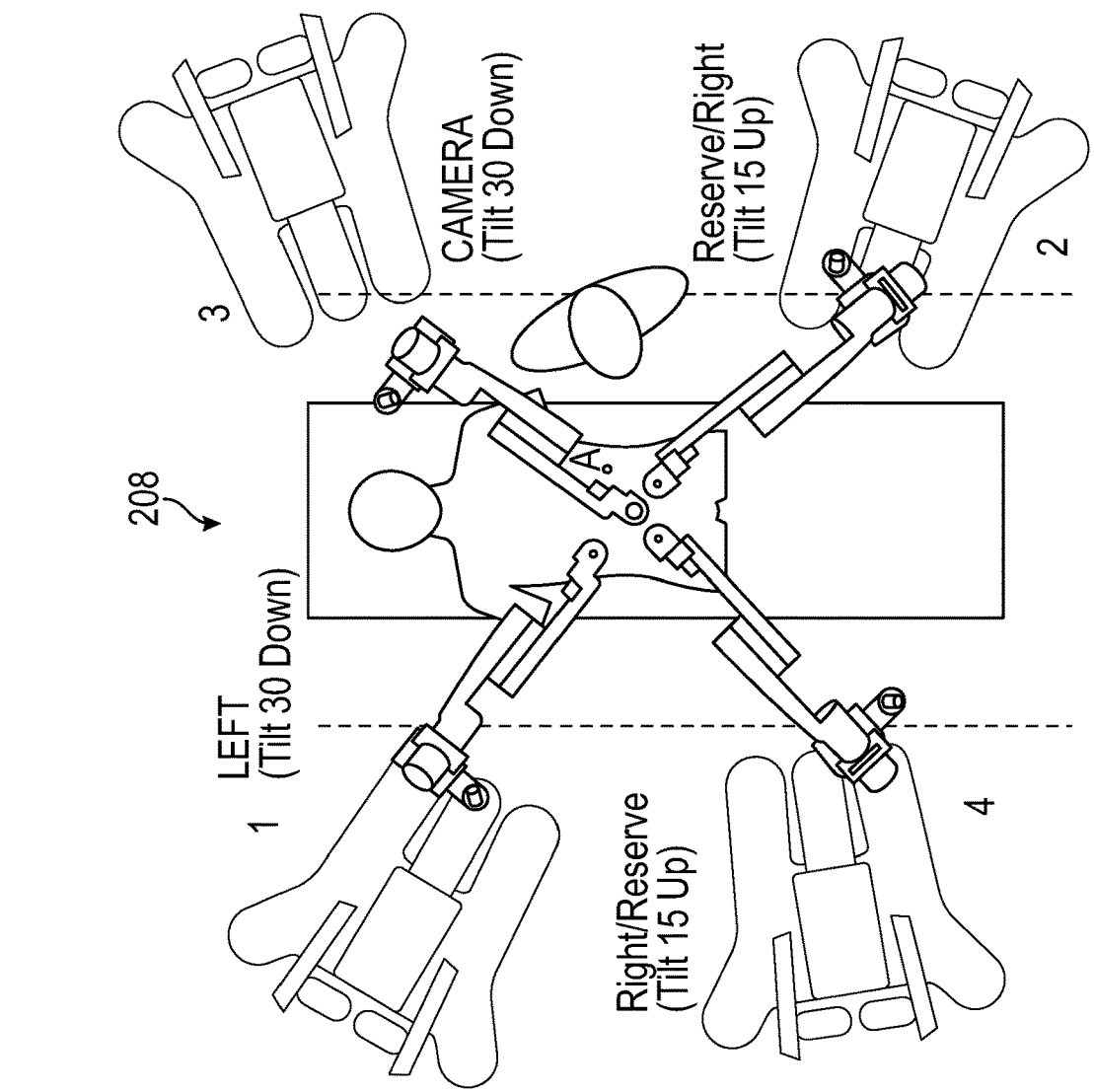
FIG. 10 is an additional image of the GUI for restoring the surgical robotic system according to an embodiment of the present disclosure.
Figure 10:
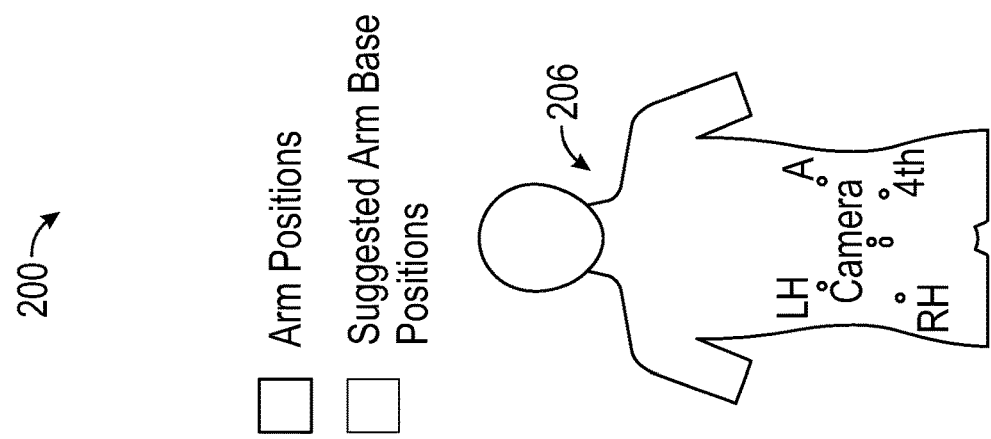

At step 116, the controller 21a determines if there is an additional step, and if so, returns to step 112 to display the next step in the restoration process, which may include additional graphical representations and/or written instructions for the operating staff. With reference to FIG. 10, additional steps of the instructions may include diagram 206 of the patient with location for access ports as well as a plan diagram 208 illustration position and orientation of each of the robotic arms 40a-d. The plan diagram 208 is similar to the actual position of the robotic arms 40a-d and associated mobile carts 60a-d as shown in FIG. 5. If there are no additional steps, and the last restoration step was completed and confirmed, the restoration process is complete at step 118 and the GUI 200 may display a message indicating the same and/or output an audio tone of the successful restoration. The controller 21a then exits the recovery mode and enters the ready mode, i.e., operational state during which the system 10 is used to perform surgery.

In embodiments, steps 112-116 may be automated and the controller 21a is configured to restore the system 10 based on the configuration data by moving each of the robotic arms 40a-d into the desired configuration. The controller 21a may pause to allow intervention by the staff, e.g., connecting instruments 50 to the IDU 52, and after confirmation that the manual steps are completed, the automated restoration process is resumed. The automated process may be commenced by receiving a confirmation from the user through the GUI 200 or any other interface.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

What is claimed is:
1. A surgical robotic system comprising:
a surgical robotic arm including an instrument and an instrument drive unit configured to actuate the instrument;
a surgeon console configured to receive user input to control at least one of the surgical robotic arm and the instrument;
a control tower coupled to the surgical robotic arm and the surgeon console, the control tower including:
a storage device;

a controller configured to:
  store a save point on the storage device, the save point including configuration data pertaining to at least one of the surgical robotic arm, the instrument drive unit, or the instrument;
  detect an error resulting in a reboot of at least one of the surgical robotic arm, the instrument drive unit, the instrument, the surgeon console, or the control tower;
  enter a recovery mode after the reboot of at least one of the surgical robotic arm, the surgeon console;
  access the configuration data of the save point in the recovery mode;
  output a graphical user interface displaying instructions including at least one step for restoring at least one of the surgical robotic arm, the instrument drive unit, the instrument, the surgeon console, or the control tower based on the configuration data; and
  exit the recovery mode after confirmation the at least one step is completed based on one of user input or sensor feedback.

2. The surgical robotic system according to claim 1, wherein the controller is further configured to:
  determine a phase of a surgical procedure being performed by the surgical robotic arm.

3. The surgical robotic system according to claim 2, wherein the controller is further configured to:
  store the save point on the storage device based on the determination of a particular phase of the surgical procedure.

4. The surgical robotic system according to claim 1, wherein the at least one step of the instructions includes a graphical representation of at least one of the surgical robotic arm, the instrument drive unit, or the instrument to be moved into a position as indicated in the configuration data.

5. The surgical robotic system according to claim 1, further comprising a mobile cart, wherein the surgical robotic arm is coupled to the mobile cart.

6. The surgical robotic system according to claim 5, wherein the at least one step of the instructions includes a graphical representation of the mobile cart including orientation of the mobile cart relative to a patient table.

7. The surgical robotic system according to claim 2, wherein the controller is further configured to:
  store the save point on the storage device in response to a user request.

8. A surgical robotic system comprising:
  a surgical robotic arm including an instrument and an instrument drive unit configured to actuate the instrument;
  a storage device;
  a controller configured to:
    store a save point on the storage device, the save point including configuration data pertaining to at least one of the surgical robotic arm, the instrument drive unit, or the instrument;
    detect an error resulting in a reboot surgical robotic arm, the instrument drive unit, or the instrument;
    access the configuration data of the save point after the reboot of at least one of the surgical robotic arm, the instrument drive unit, or the instrument; and
    output a graphical user interface including instructions for restoring at least one of the surgical robotic arm, the instrument drive unit, or the instrument based on the configuration data.

9. The surgical robotic system according to claim 8, wherein the controller is further configured to:
  determine a phase of a surgical procedure being performed by the surgical robotic arm.

10. The surgical robotic system according to claim 9, wherein the controller is further configured to:
  store the save point on the storage device based on the determination of a particular phase of the surgical procedure.

11. The surgical robotic system according to claim 8, wherein the instructions include a graphical representation of at least one of the surgical robotic arm, the instrument drive unit, or the instrument to be moved into a position as indicated in the configuration data.

12. The surgical robotic system according to claim 8, further comprising a mobile cart, wherein the surgical robotic arm is coupled to the mobile cart.

13. The surgical robotic system according to claim 12, wherein the instructions include a graphical representation of the mobile cart including orientation of the mobile cart relative to a patient table.

14. The surgical robotic system according to claim 9, wherein the controller is further configured to:
  store the save point on the storage device in response to a user request.

15. A method for restoring operational state of a surgical robotic system, the surgical robotic system including a surgeon console, a control tower, and a surgical robotic arm including an instrument and an instrument drive unit configured to actuate the instrument, the method comprising:
  storing a save point on a storage device, the save point including configuration data pertaining to at least one of the surgical robotic arm, the instrument drive unit, or the instrument;
  detecting an error resulting in a reboot of at least one of the surgical robotic arm, the instrument drive unit, the instrument, the surgeon console, or the control tower;
  entering a recovery mode after the reboot of at least one of the surgical robotic arm, the surgeon console;
  accessing the configuration data of the save point in the recovery mode; and
  automatically restoring at least one of the surgical robotic arm, the instrument drive unit, or the instrument based on the configuration data.

16. The method according to claim 15, further comprising:
  determining a phase of a surgical procedure being performed by the surgical robotic arm.

17. The method according to claim 16, wherein the save point is stored based on the determination of a particular phase of the surgical procedure.

18. The method according to claim 16, wherein the save point is stored in response to a user request.

19. The method according to claim 15, further comprising:
  outputting a graphical user interface displaying instructions including at least one step for restoring at least one of the surgical robotic arm, the instrument drive unit, or the instrument based on the configuration data; and
  exiting the recovery mode after confirmation the at least one step is completed based on one of user input or sensor feedback.

20. The method according to claim 19, further comprising:

displaying a graphical representation of at least one of the surgical robotic arm, the instrument drive unit, or the instrument to be moved into a position as indicated in the configuration data; and displaying a graphical representation of a mobile cart coupled to the surgical robotic arm, the graphical representation including orientation of the mobile cart relative to a patient table.

\* \* \* \* \*